United States Patent [19]

Möckli

[11] Patent Number: 4,883,866
[45] Date of Patent: Nov. 28, 1989

[54] METHINE-AZO COMPOUNDS CONTAINING CYCLIC CATIONIC AMMONIUM GROUPS

[75] Inventor: Peter Möckli, Schönenbuch, Switzerland

[73] Assignee: Ciba-Geigy Corporation, Ardsley, N.Y.

[21] Appl. No.: 161,288

[22] Filed: Feb. 29, 1988

Related U.S. Application Data

[63] Continuation of Ser. No. 767,910, Aug. 21, 1986, abandoned.

[30] Foreign Application Priority Data

Aug. 22, 1984 [CH] Switzerland .................. 4018/84

[51] Int. Cl.$^4$ ............... C09B 44/08; C09B 44/10; D06P 1/41
[52] U.S. Cl. .................. 534/606; 534/605; 534/607; 534/610; 534/619; 534/691
[58] Field of Search ............... 534/603, 604, 605, 606, 534/607, 610

[56] References Cited

U.S. PATENT DOCUMENTS

| | | | |
|---|---|---|---|
| 3,185,538 | 5/1965 | Voltz et al. | 534/605 X |
| 3,331,381 | 7/1967 | Raue et al. | 534/606 X |
| 3,338,660 | 8/1967 | Biedermann | 534/603 X |
| 3,933,786 | 1/1976 | Peter et al. | 534/606 |
| 3,956,264 | 5/1976 | Raue et al. | 534/606 |
| 4,557,732 | 12/1985 | Hahnke et al. | 534/605 X |

FOREIGN PATENT DOCUMENTS

| | | | |
|---|---|---|---|
| 2620790 | 11/1976 | Fed. Rep. of Germany | 534/605 |
| 875995 | 8/1961 | United Kingdom | 534/605 |
| 896681 | 5/1962 | United Kingdom | 534/605 |
| 916697 | 1/1963 | United Kingdom | 534/605 |
| 994303 | 12/1963 | United Kingdom | 534/605 |
| 1214394 | 12/1970 | United Kingdom | 534/606 |
| 1221821 | 2/1971 | United Kingdom | 534/605 |

OTHER PUBLICATIONS

2620 790 11-1976 W. Germany Frey et al.
Voltz et al. II, Chemical Abstracts, vol. 61, #1213670 12/37 (1964).

Primary Examiner—Floyd D. Higel
Attorney, Agent, or Firm—Wenderoth, Lind & Ponack

[57] ABSTRACT

Methine-azo compounds of the formula

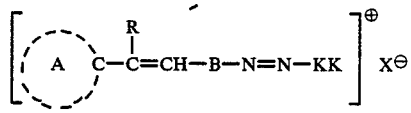

in which

A is the complement to a heterocyclic 5- or 6-membered ring which has a quaternized N atom as a ring member, which can contain further hetero atoms and which can be substituted and/or fused with carbocyclic or heterocyclic rings, R is hydrogen, cyano or $C_2$–$C_3$-alkylene which is bonded to an N atom of ring A to form a 5- or 6-membered ring, B is substituted or unsubstituted phenylene or naphthylene, $X^\ominus$ is an anion and KK is the radical of a coupling component of the benzene series, of the naphthaline series or of the heterocyclic series, with the provisos that (a) if A is the complement to a quaternized, substituted or unsubstituted pyridine, quinoline or indolenine radical, KK is not the radical of a substituted or unsubstituted phenol, sulfo-free naphthol, naphthylamine, aniline, quinoline, isoquinoline, pyrazole or indole coupling component and (b) if A is the complement to a quaternized, substituted or unsubstituted benzothiazole or pyrimidine radical, KK is not a substituted or unsubstituted phenol or aniline coupling component.

These compounds can be used as dyes for dyeing or printing for example polyacrylonitrile, acid-modified polyester and in particular paper.

9 Claims, No Drawings

METHINE-AZO COMPOUNDS CONTAINING CYCLIC CATIONIC AMMONIUM GROUPS

This application is a continuation of now abandoned application Ser. No. 767,910, filed Aug. 21, 1986.

The invention relates to novel methine-azo compounds, to processes for their preparation and to their use as dyes for dyeing and printing cationically dyeable substrates, especially paper.

The novel compounds according to the invention have the formula

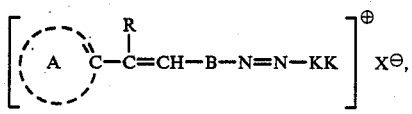

in which

A is the complement to a heterocyclic 5- or 6-membered ring which has a quaternised N atom as a ring member, which can contain further hetero atoms and which can be substituted and/or fused with carbocyclic or heterocyclic rings, R is hydrogen, cyano or $C_2$-$C_3$-alkylene which is bonded to an N atom of ring A to form a 5- or 6-membered ring, B is substituted or unsubstituted phenylene or naphthylene, $X^{\ominus}$ is an anion and KK is the radical of a coupling component of the benzene series, of the naphthalene series or of the heterocyclic series, with the provisos that (a) if A is the complement to a quaternised, substituted or unsubstituted pyridine, quinoline or indolenine radical, KK is not the radical of a substituted or unsubstituted phenol, sulfo-free naphthol, naphthylamine, aniline, quinoline, isoquinoline, pyrazole or indole coupling component and (b) if A is the complement to a quaternised, substituted or unsubstituted benzothiazole or pyrimidine radical, KK is not a substituted or unsubstituted phenol or aniline coupling component.

A and the

configuration together are a heterocyclic 5- or 6-membered ring which contains a quaternised N atom as a ring member. This ring can also contain further hetero atoms (N, O or S), for example one or two, in particular one. This ring can be fused with one or more heterocyclic or preferably carbocyclic rings, in particular a benzo or naphtho ring. The stated rings and ring systems can also carry further substituents, except for the substituent on the N atom which leads to quaternisation thereof. Examples of such substituents are nitro, halogen, cyano, $C_1$-$C_4$-alkyl, $C_1$-$C_4$-alkoxy, acetylamino and dimethylamino. The substituent on the quaternised nitrogen atom can be for example phenyl, $C_1$-$C_8$-alkyl, $C_2$-$C_8$-alkenyl or $C_3$-$C_6$-cycloalkyl, it being possible for the alkyl, alkenyl or cycloalkyl chain to be interrupted by oxygen or nitrogen atoms and/or be substituted by halogen, cyano, hydroxyl, alkoxy, phenyl, phenoxy, dialkylamino, trialkylammonium, acetylamino, alkylcarbonyl, alkoxycarbonyl, alkylsulfonyl, phenylsulfonyl, benzylsulfonyl, alkylsulfonamido, phenylsulfonamido, benzylsulfonamido, alkylcarbonylamino, benzoyl, benzoylamino, alkylcarbamoyl, phenylcarbamoyl, benzylcarbamoyl, alkylcarbamoyloxy, phenylcarbamoyloxy or benzylcarbamoyloxy.

A is for example the complement to a pyrimidine, pyridine, quinoline, thiazole, imidazole, oxazole or pyrrole ring, it being possible for these rings, which are quaternised at the N atom, to be fused with carbocyclic rings, preferably with a benzo or naphtho ring, and to be further substituted. Examples of substituents on the quaternised N atom and of additional substituents are listed in the preceding paragraph.

In particular A is the complement to a pyridine ring which can be substituted or/and be fused with carbocyclic rings.

In practically important compounds of the formula (I), A is the complement to one of the following rings:

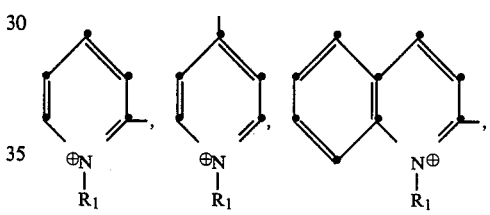

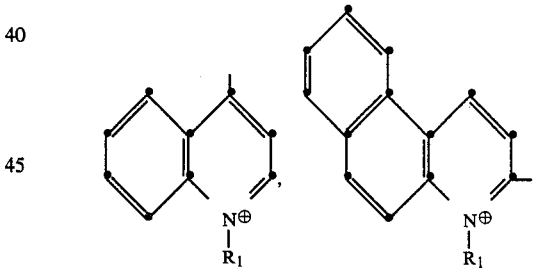

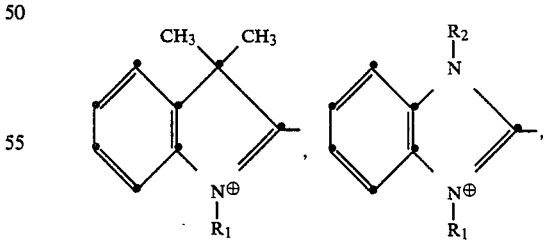

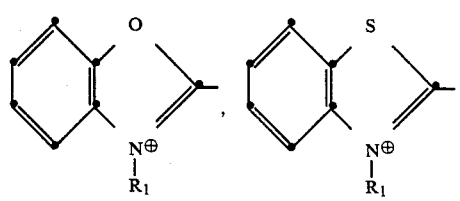

-continued

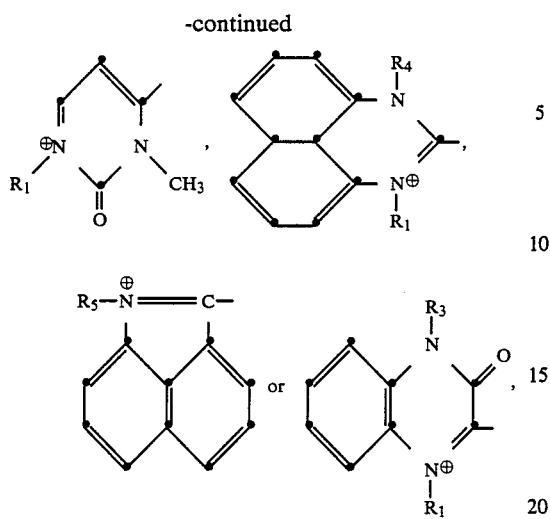

it being possible for these rings to be substituted, in addition to the substituents, $R_1$–$R_5$, by nitro, halogen, cyano, $C_1$–$C_4$-alkyl, $C_1$–$C_4$-alkoxy, acetylamino or dimethylamino, and in which $R_1$, $R_2$, $R_3$ and $R_4$, independently of one another, are $C_1$–$C_8$-alkyl, $C_2$–$C_8$-alkenyl, or $C_3$–$C_6$-cycloalkyl, it being possible for the alkyl, alkenyl or cycloalkyl chain to be interrupted by oxygen or nitrogen atoms and/or be substituted by halogen, cyano, hydroxyl, alkoxy, phenyl, phenoxy, dialkylamino, trialkylammonium, acetylamino, alkylcarbonyl, alkoxycarbonyl, alkylsulfonyl, phenylsulfonyl, benzylsulfonyl, alkylsulfonamido, phenylsulfonamido, benzylsulfonamido, alkylcarbonylamino, benzoyl, benzoylamino, alkylcarbamoyl, phenylcarbamoyl, benzylcarbamoyl, alkylcarbamoyloxy, phenylcarbamoyloxy or benzylcarbamoyloxy, and $R_5$ is phenyl or is defined as $R_1$.

A is in particular the complement to one of the following rings:

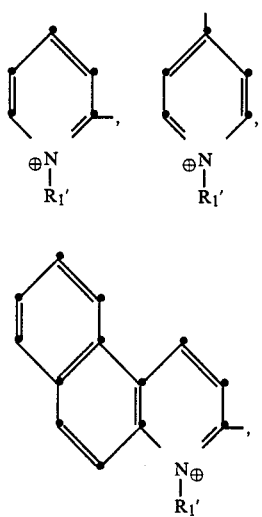

-continued

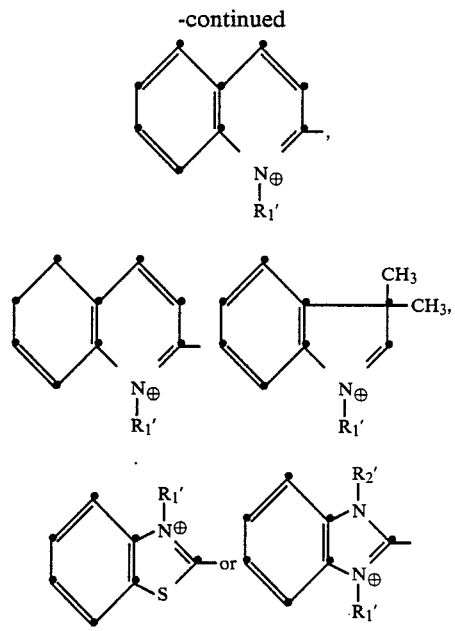

in which $R_1'$ and $R_2'$, independently of each other, are $C_1$–$C_4$-alkyl, benzyl, cyclohexyl, hydroxyalkyl or $C_3$–$C_4$-alkenyl and the stated rings are otherwise unsubstituted or substituted by halogen, cyano, $C_1$–$C_4$-alkyl, $C_1$–$C_4$-hydroxyalkyl or $C_1$–$C_4$-alkoxy.

A is particularly preferably the complement to a pyridine ring which can be substituted and/or fused with carbocyclic rings, preferred fused-on rings and substituents being mentioned above. A is in particular the complement to a pyridine ring whose N atom is quaternised with $C_1$–$C_4$-alkyl, especially methyl, and which can be additionally substituted by one or two $C_1$–$C_4$-alkyl groups, the link to the

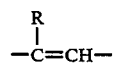

group being effected in the 2- or 4-position.

In likewise noteworthy compounds of the formula (I), A is the complement to a pyridinium or 3,3-dimethylindoleninium ring of the above formulae in which $R_1'$ is methyl.

A $C_2$–$C_3$-alkylene group R which is bonded to an N atom of ring A to form a 5- or 6-membered ring has for example the following structures:

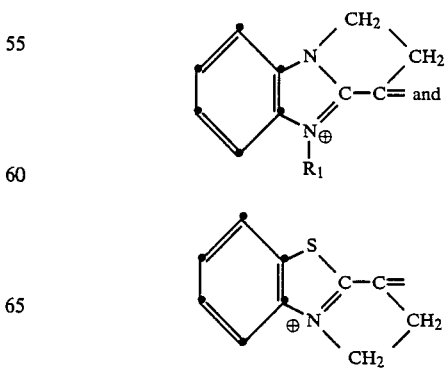

and similar. However, preferably R is hydrogen.

Examples of possible substituents in the phenylene or naphthylene ring B are: $C_1$–$C_4$-alkyl (for example methyl, ethyl, n- and iso-propyl), $C_1$–$C_4$-alkoxy (for example methoxy, ethoxy, n-butoxy, dimethylaminoethoxy, trimethylaminoethoxy), halogen (for example fluorine, chlorine, bromine), $SO_3H$ and acylamino (for example acetylamino). In preferred compounds, B is the phenylene ring which can be substituted by 1 or 2 substituents from the group comprising $C_1$–$C_4$-alkyl, $C_1$–$C_4$-alkoxy and halogen.

Substituted or unsubstituted phenylene B in compounds of the formula (I) is preferably 1,4-phenylene, especially unsubstituted 1,4-phenylene.

Of compounds of the formula (I), preference is given to those in which A, R, B and $X^\ominus$ are as defined under the formula (I) and KK is the radical of a coupling component of the benzene series, of the naphthalene series or of the heterocyclic series with the exception of a substituted or unsubstituted phenol, naphthylamine, sulfo-free naphthol, aniline, quinoline, isoquinoline, pyrazole or indole coupling component.

KK is the radical of a coupling component customary in azo chemistry, in particular in the chemistry of azo dyes, of the benzene series, of the naphthalene series or of the heterocyclic series. However, note needs to be taken of the provisos (a) and (b) specified under the formula (I). Of the large number of possible coupling components, the following may be mentioned as examples:

(1) Benzene series (a) Phenols of the formula

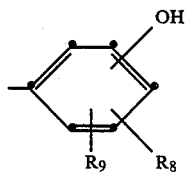

in which $R_8$ and $R_9$, independently of each other, are hydrogen, $C_1$–$C_4$-alkyl, OH, $C_1$–$C_4$-alkoxy, $SO_3H$, COOH, alkoxycarbonyl, acyl, acylamino, alkenyl, cyclopentyl, cyclohexyl, aryl, benzyl, phenethyl or halogen. Examples of such phenols are:

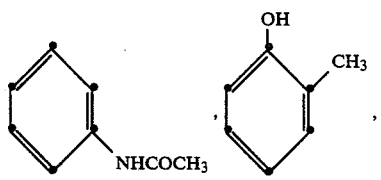

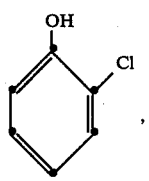

-continued

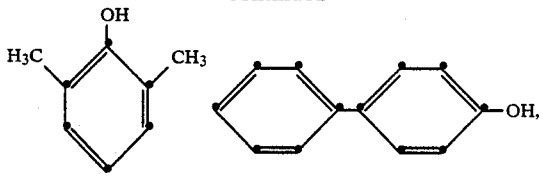

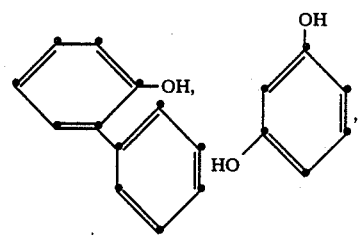

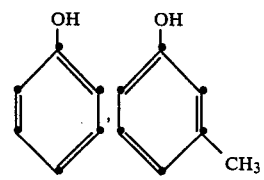

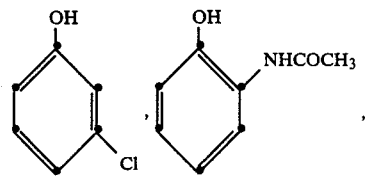

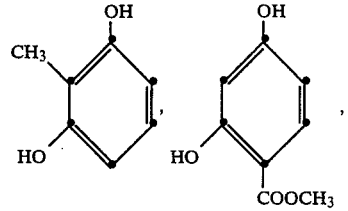

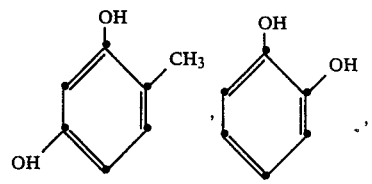

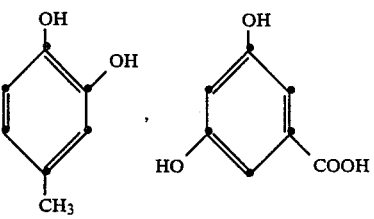

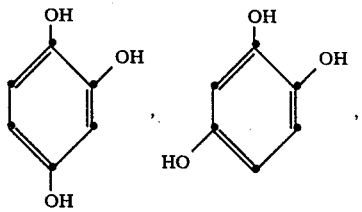

-continued

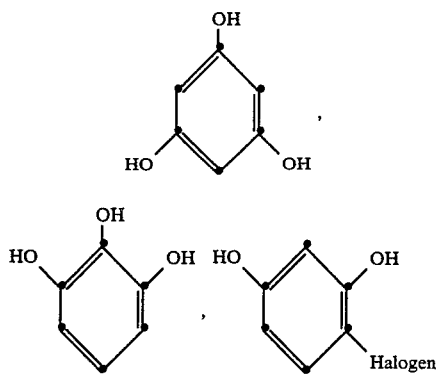

(b) benzenes of the formula

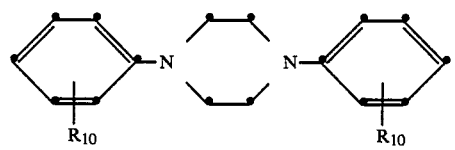

in which R$_{10}$ is hydrogen, C$_1$–C$_4$-alkyl or OH;

(c) benzenes of the formula

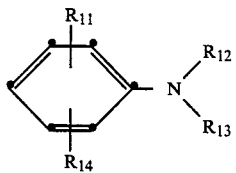

in which

R$_{11}$ is H, C$_1$–C$_4$-alkyl, OH, C$_1$–C$_4$-alkoxy, halogen, SO$_3$H or acylamino, R$_{12}$ and R$_{13}$ independently of each other are: H, C$_1$–C$_8$-alkyl, alkenyl, cycloalkyl, aryl, benzyl, phenethyl, C$_1$–C$_4$-alkoxy, hydroxyethyl, cyanoethyl, halogenoethyl,

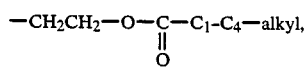

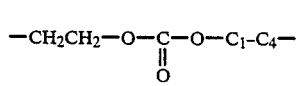

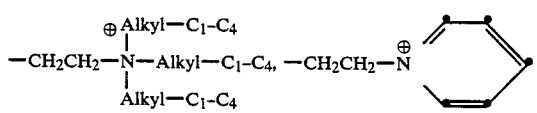

where R$_{12}$ together with the benzene nucleus can also be a 5- or 6-membered saturated ring, if desired with inclusion of further hetero atoms, R$_{12}$ and R$_{13}$ together can also be a 5- or 6-membered ring, if desired with inclusion of further hetero atoms, for example a piperidine, piperazine or morpholine ring, R$_{14}$ is H, C$_1$–C$_4$-alkyl, halogen, CF$_3$, OH, C$_1$–C$_4$-alkoxy or amino; for example:

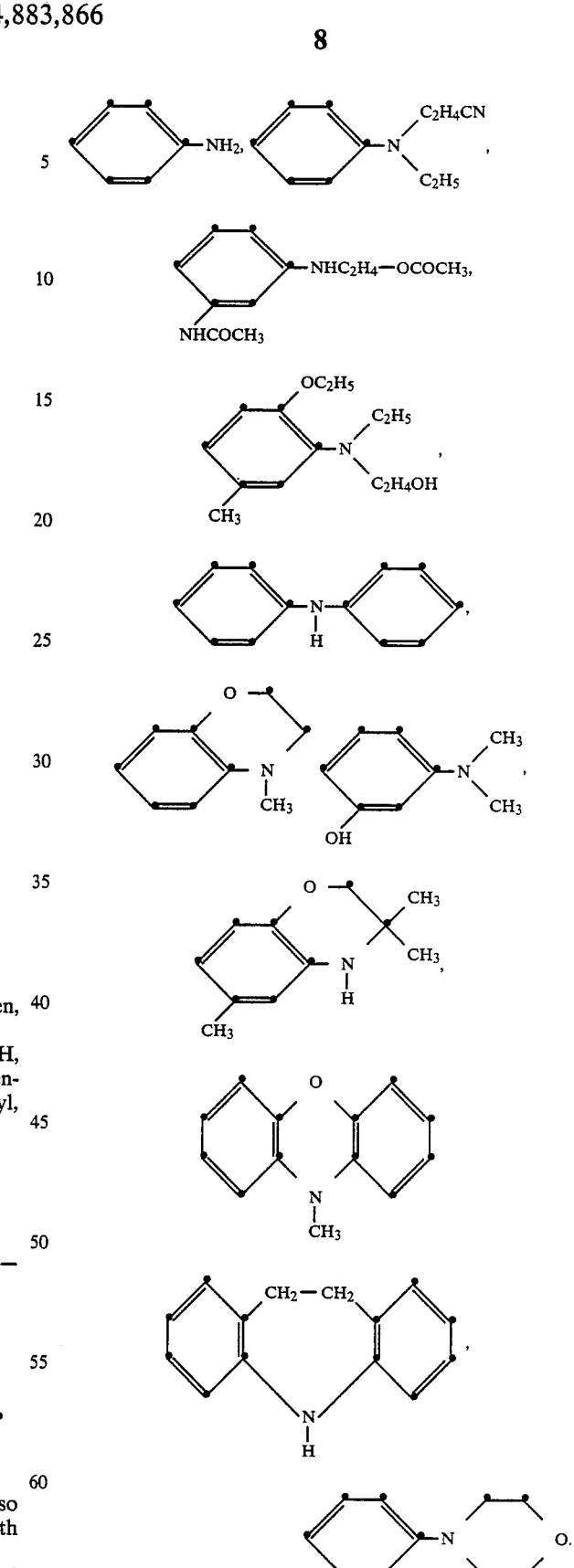

(2) Naphthalene series (a) α-Naphthols of the formula

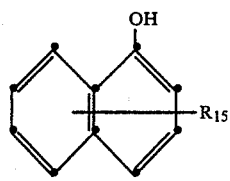

in which R$_{15}$ is hydrogen, OH or SO$_3$H, for example:

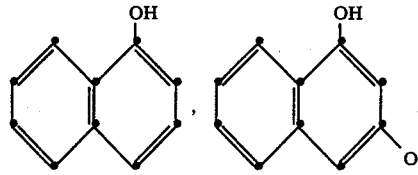

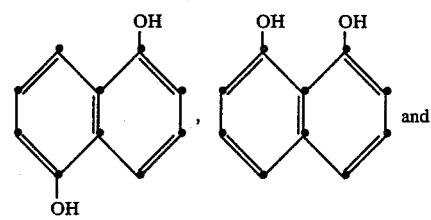

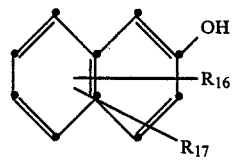

(b) β-Naphthols of the formula

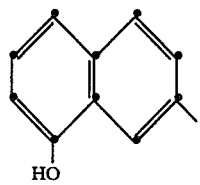

in which:
R$_{16}$ is hydrogen, OH, SO$_3$H or SO$_2$NH$_2$,
R$_{17}$ is hydrogen,

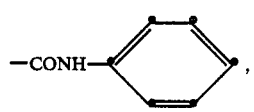

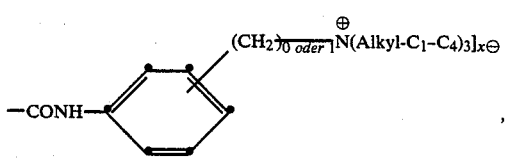

—CONH—(CH$_2$)$_p$—N—(Alkyl-C$_1$-C$_4$)$_2$,

—(CH$_2$)$_p$—$\overset{\oplus}{N}$(Alkyl-C$_1$-C$_4$)$_3$ |$_{x\ominus}$ and
is 2 or 3, X$^\ominus$ is an anion; for example:

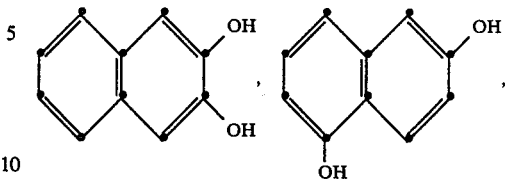

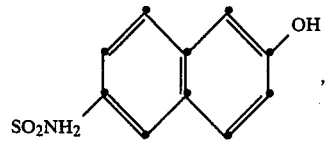

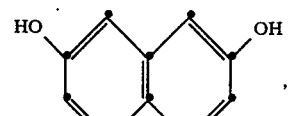

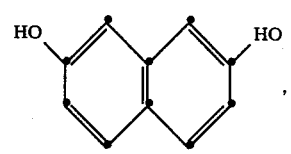

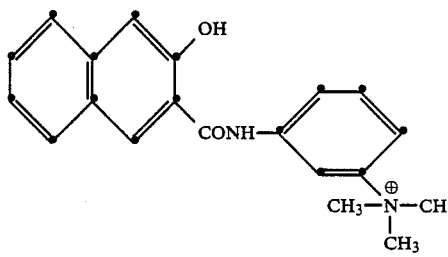

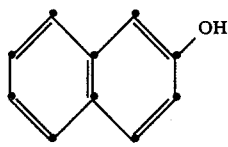

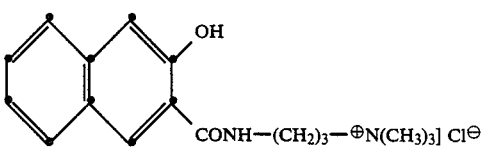

(c) Naphthols of the formula

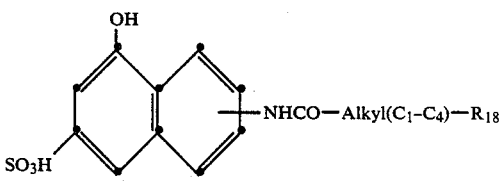

in which
R$_{18}$ is a basic amino group or a cationic ammonium group;
for example

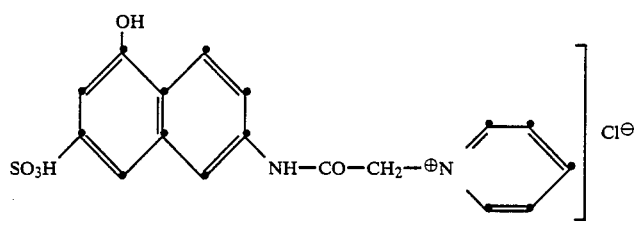

(d) Naphthols as described in DE-A-No. 3,114,087 which have the formula

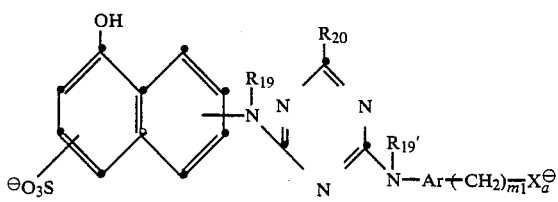

in which
R$_{19}$ is hydrogen or C$_1$–C$_4$-alkyl,
Ar is arylene, in particular phenylene,
R$_{20}$ is halogen, hydroxyl, C$_1$–C$_4$-alkoxy or a monosubstituted or disubstituted amino group,
m$_1$ is 0 or 1 and
X$_a^{(+)}$ is an ammonium group, and in which the cyclic and acyclic radicals can carry further nonionic substituents; for example:

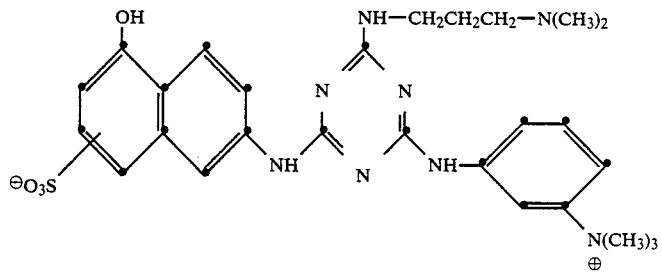

(e) Naphthols as described in EP-A-No. 065,595 of the formula

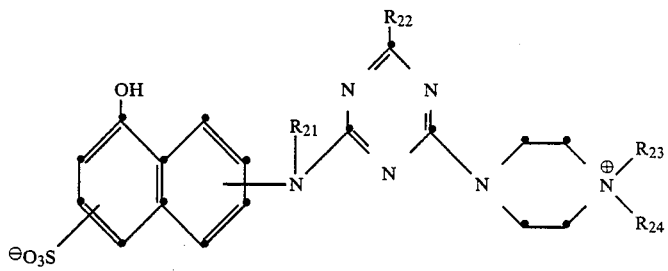

in which
R$_{21}$ is hydrogen or alkyl,
R$_{22}$ is halogen, hydroxyl, alkoxy or monosubstituted or disubstituted amino group whose substituents can be cyclised—if desired via a hetero atom—to form a 5- or 6-membered nitrogen heterocycle, for example to form a piperidine, piperazine or morpholine ring,
R$_{23}$ and R$_{24}$ independently of each other are hydrogen, alkyl, alkenyl or aralkyl,
and in which the cyclic and acyclic radicals can carry further substituents, for example:

(f) Naphthols as described in DE-A-No. 3,224,786 of the formula

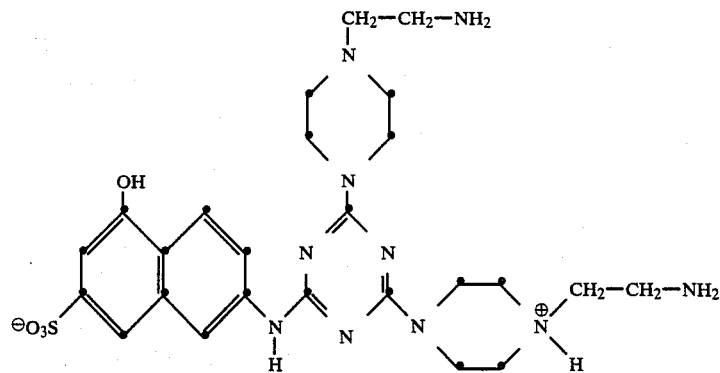

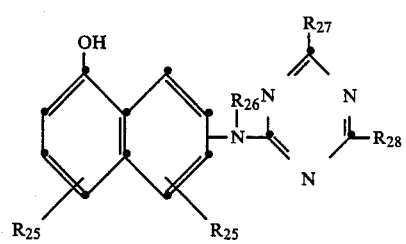

in which:
R$_{25}$ is —SO$_3$H or a salt thereof,
R$_{26}$ is hydrogen or C$_1$–C$_4$-alkyl,
R$_{27}$ is halogen, OH, alkoxy or a monosubstituted or disubstituted amino group, including a 5- or 6-membered cyclic amine,
R$_{28}$ is a substituted piperazine of the formula

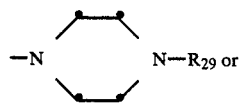

-continued

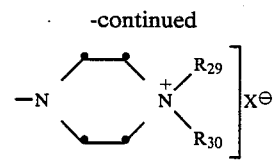

in which R$_{29}$ and R$_{30}$ are H, alkyl, alkenyl, aminoalkyl or aralkyl; and X is an anion; for example:

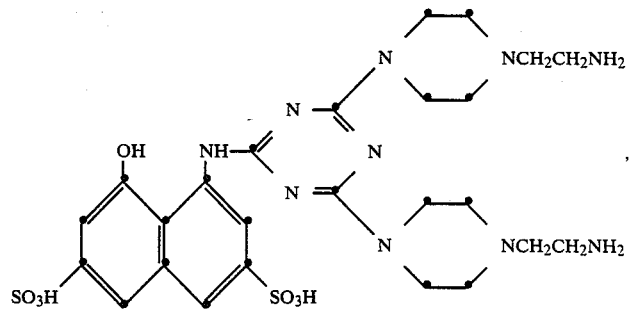

(g) Naphthols of the formula

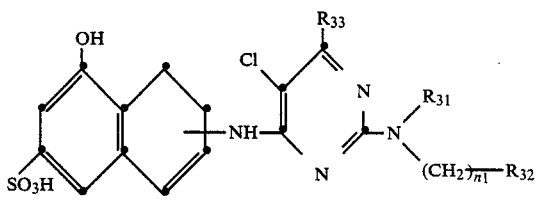

in which:
R$_{31}$ is hydrogen or C$_1$–C$_4$-alkyl,
R$_{32}$ is a basic amino group or a cationic ammonium group or
R$_{31}$ together with R$_{32}$ is bonded with inclusion of the N atom to form a heteroaliphatic ring, for example one of those of the formula

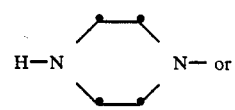

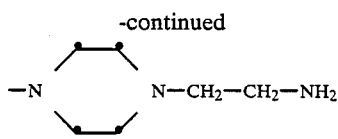

$R_{33}$ is halogen, OH, alkoxy or a monosubstituted or disubstituted amino group and $n_1$ is the numbers 2, 3 or 4.

(h) Naphthols as described in DE-A-No. 3,133,568 of the formula

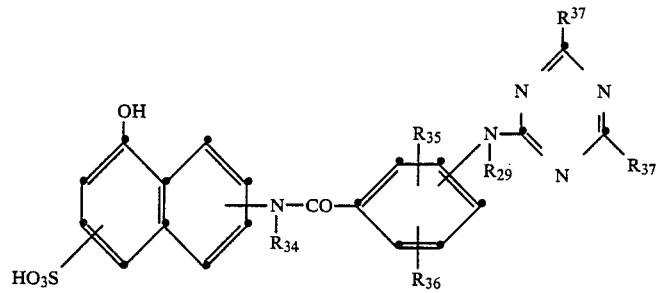

in which $R_{34}$ is hydrogen or alkyl, $R_{35}$ and $R_{36}$ independently of each other are hydrogen, alkyl, alkoxy or halogen, and $R_{37}$ is hydroxyl, alkoxy or a monosubstituted or disubstituted amino group or a cyclic amino group which can be further substituted, for example:

$R_{38}$ is hydrogen or $C_1$-$C_4$-alkyl, $R_{39}$ is hydrogen or $C_1$-$C_4$-alkyl, $R_{40}$ is a basic amino group or a cationic ammonium group, or $R_{39}$ together with $R_{40}$ is a heteroaliphatic ring which can in turn be substituted, for example a ring of the formula

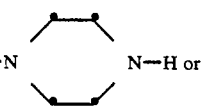

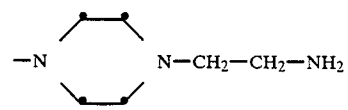

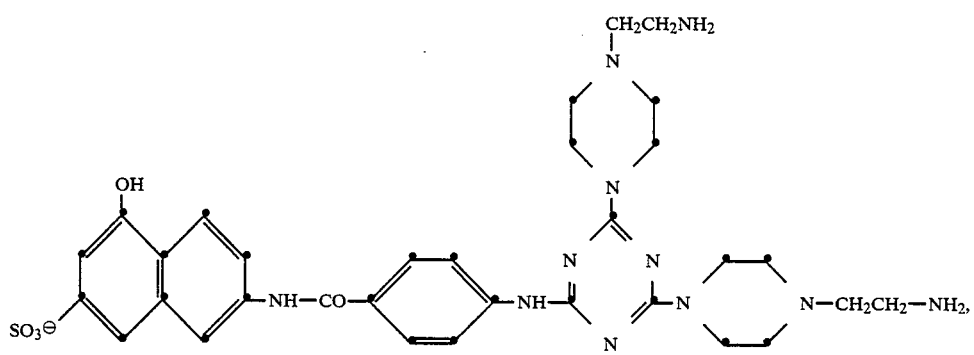

(i) Bis-naphthols of the formula

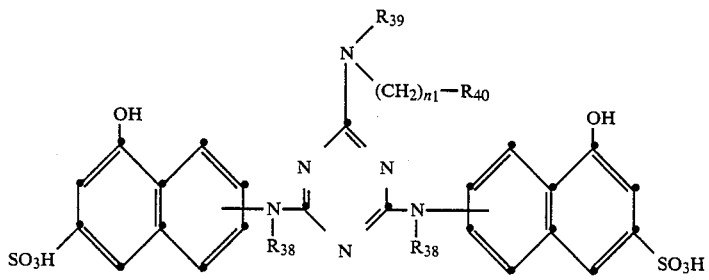

in which and $n_1$ is the numbers 2, 3 or 4; for example:

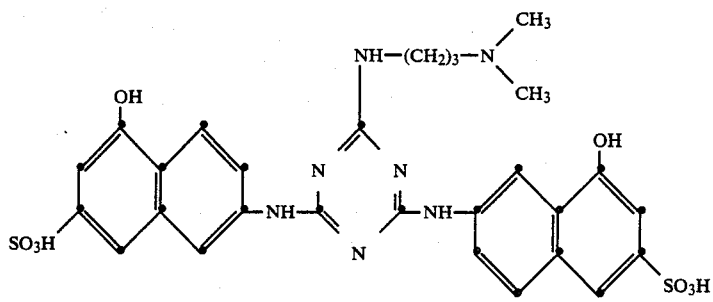

(k) α-Naphthylamines of the formula

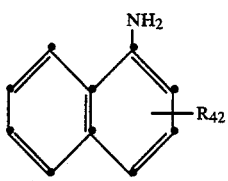

in which $R_{42}$ is hydrogen, OH or $SO_3H$, for example:

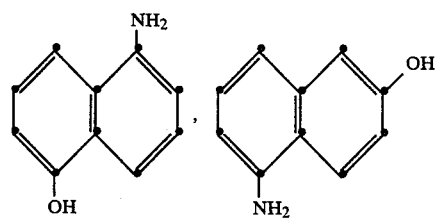

(l) β-Naphthylamines of the formula

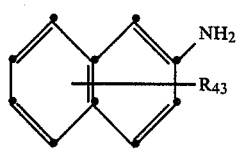

in which $R_{43}$ is hydrogen, OH, $NH_2$ or $SO_3H$, for example:

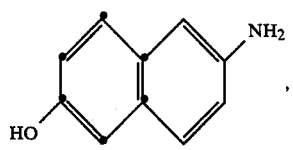

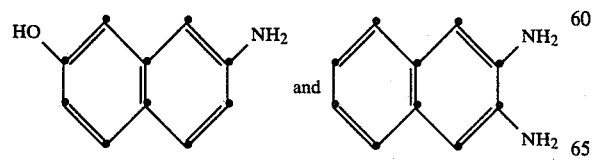

(m) α-Naphthols as described in DE-A-No. 2,915,323 of the formula

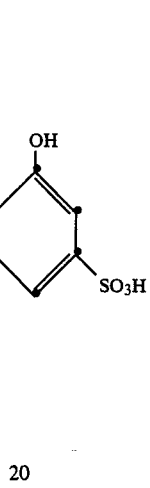

in which $R_o$ is hydrogen, $NH_2$, $(C_1-C_4)$alkylcarbonylamino, benzoylamino whose phenyl radical can be substituted by 1 or 2 substituents from the series comprising halogen, $NO_2$, $NH_2$, $C_1-C_4$-alkyl and $C_1-C_4$-alkoxy; or

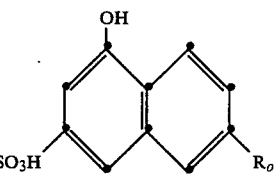

in which $R'_o$ is hydrogen or $C_1-C_4$-alkyl and $R''_o$ is OH, $NH_2$ or an aliphatic, cycloaliphatic or aromatic amino radical which has for example the formula —N-$R_a$—Q—$NR_bR_c$ in which $R_a$ is H or $CH_3$, Q is $C_1-C_6$-alkylene, $R_b$ and $R_c$ are H, $C_1-C_4$-alkyl, 2-hydroxyethyl, or together with the N atom are a piperidine, piperazine or morpholine ring and the group —$NR_bR_c$ can also be quaternised; for example:

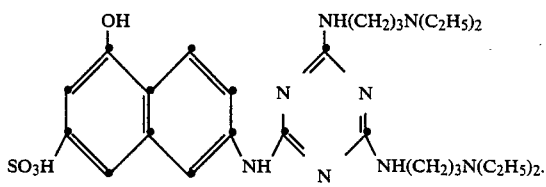

(3) Coupling components of the heterocyclic series (a) pyridines as described in DE-A-Nos. 3,201,268 and 3,206,092, for example those of the formula

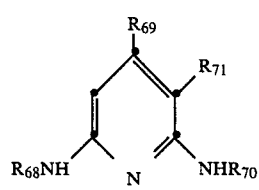

in which: $R_{71}$ is CN, $C_1$-$C_4$-alkyl, $NO_2$ or halogen; $R_{68}$ and $R_{70}$ are H, $C_1$-$C_4$-alkyl, alkenyl, cyclohexyl, aryl, benzyl, phenethyl or one of the radicals of $R_{68}$ and $R_{70}$ is phenyl which can be monosubstituted or polysubstituted by Cl, $CH_3$, $C_2H_5$, tert.-butyl, phenoxy, methoxy, ethoxy, propoxy or butoxy and the other of the radicals $R_{68}$ and $R_{70}$ is unsubstituted or $C_1$-$C_4$-alkoxy- or phenyl-substituted $C_2$-$C_8$-alkyl, allyl, cyclopentyl, cyclohexyl or methylcyclohexyl,

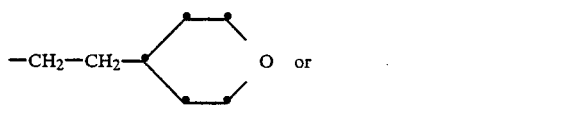

, and $R_{69}$ is hydrogen, $CH_3$, $C_2H_5$ or $C_3H_7$; for example

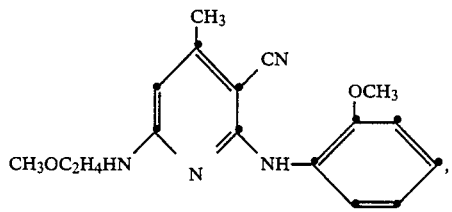

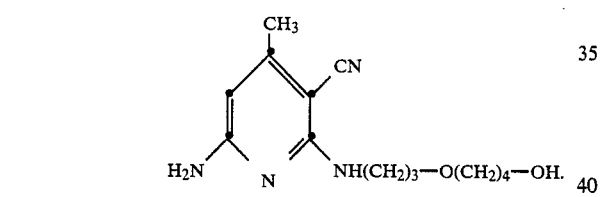

(b) pyridines as described in DE-A-Nos. 2,436,897 and 3,296,092, for example those of the formula:

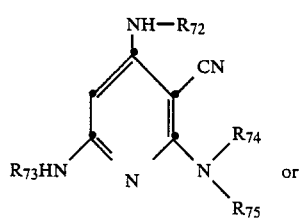  or

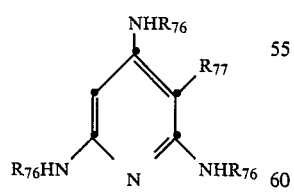

in which:

$R_{72}$ and $R_{73}$ are a $C_1$-$C_8$-alkyl group which can be substituted by $C_1$-$C_8$-alkoxy, $R_{74}$ and $R_{75}$ are a hydrogen atom, a $C_1$-$C_8$-alkyl group which can be substituted by hydroxyl, amino, $C_1$-$C_8$-alkoxy or $NT_1T_2$, a cycloalkyl group which can be substituted by methyl radicals, a benzyl group which can be substituted by 1 to 3 chlorine, $C_1$-$C_4$-alkyl or $C_1$-$C_4$-alkoxy or together are the radicals —$(CH_2)_4$—, —$(CH_2)_3$—, —$(CH_2)_4$—, —$(CH_2)_3$—O—$(CH_2)_3$—, —$(CH_2)_3$—$NCH_3$—$(CH_2)_3$—, —$(CH_2)_3$-S-$(CH_2)_3$— or —NH—$(CH_2)_3$— and $T_1$ and $T_2$ are a $C_1$-$C_8$-alkyl group, $R_{76}$ is H, $C_1$-$C_4$-alkyl, alkenyl, cyclohexyl, aryl or benzyl, $R_{77}$ is CN, COOH, COOalkyl, COOcyclohexyl, COOaryl, COObenzyl, alkyl($C_1$-$C_4$), $NO_2$, halogen, $SO_2$-alkyl($C_1$-$C_4$); for example:

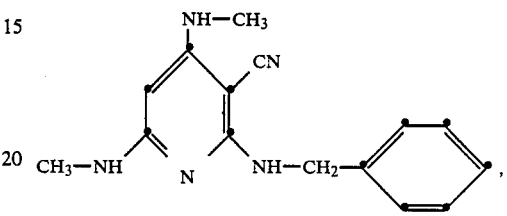

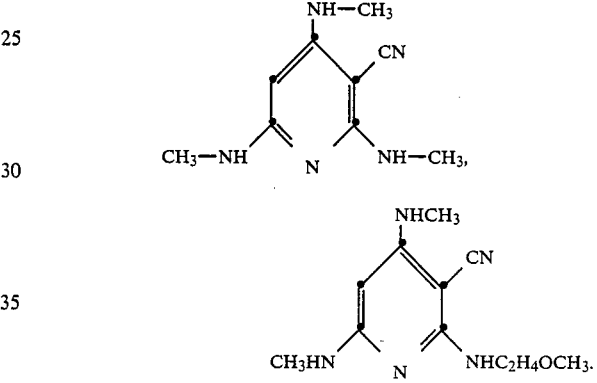

(c) pyridones of the formula

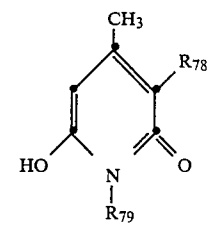

in which:

$R_{79}$ is substituted or unsubstituted $C_1$-$C_8$-alkyl, or hydrogen and $R_{78}$ is CN, $CONH_2$ and $SO_2NH_2$; for example:

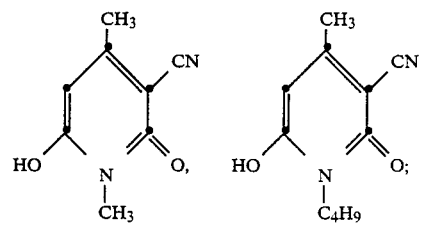

(d) pyridones as described in CH-A-No. 628,078 of the formula:

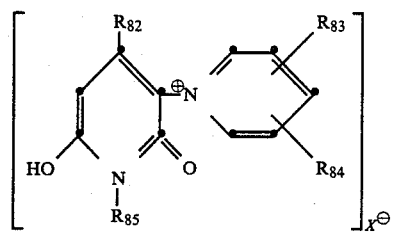

in which:

$R_{82}$, $R_{83}$ and $R_{84}$ independently of one another are H or $C_1$-$C_4$-alkyl, $R_{85}$ is H or $C_1$-$C_{20}$-alkyl and X is an anion; for example:

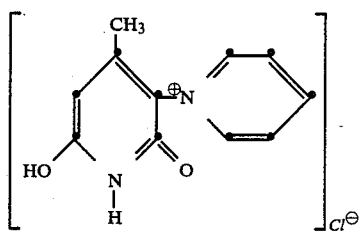

(e) pyridones as described in DE-A-No. 3,037,911 of the formula

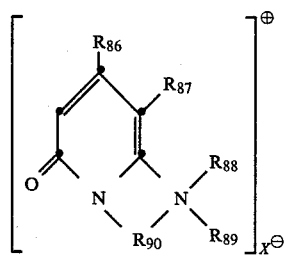

in which:

$R_{86}$ is H, $C_1$-$C_4$-alkyl, cycloalkyl, aryl, aralkyl, heterocycle, CN, OH, $COOR_{91}$, $CONR_{91}R_{92}$, $COR_{92}$ or $CONH_2$, ($R_{91}$ and $R_{92}$ = $C_1$-$C_4$-alkyl, cycloalkyl, aryl, aralkyl, heterocycle where $R_{92}$ can also be H)

$R_{87}$ is $R_{86}$, halogen or $NO_2$ $R_{88}$ and $R_{89}$ are $C_1$-$C_4$-alkyl, cycloalkyl, aryl, aralkyl, alkenyl where $R_{89}$ can also be H, $R_{90}$ is a bridge member and X is an anion; for example:

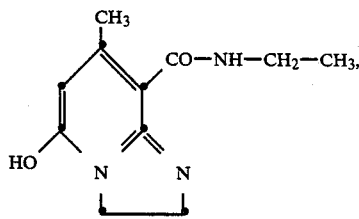

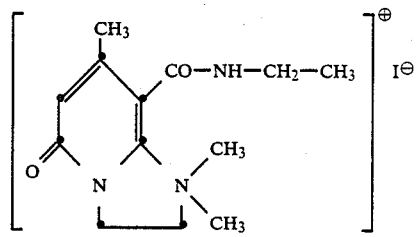

(g) 8-Hydroxyquinoline of the formula

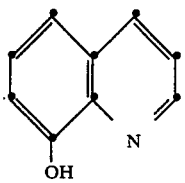

(h) indoles of the formulae:

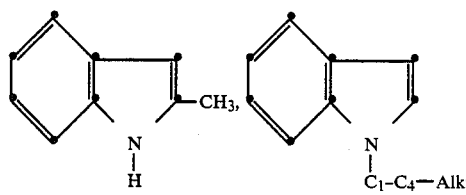

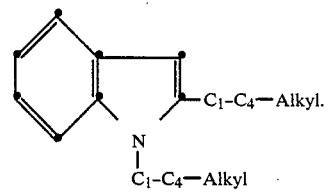

(i) pyrimidines of the formula:

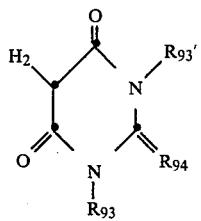

in which $R_{93}$ and $R'_{93}$ are hydrogen or $C_1$-$C_4$-alkyl and $R_{94}$ is O or N-CN; for example:

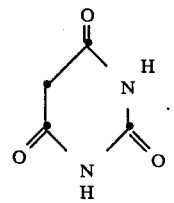

(k) pyrimidines as described in EP-A-87,037 of the formula:

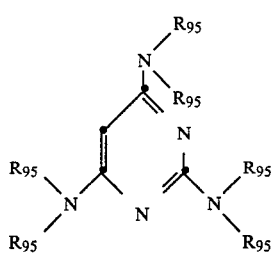

in which:

each $R_{95}$ independently of the others is H, $C_1$-$C_4$-alkyl, alkenyl, cyclopentyl, cyclohexyl, aryl, benzyl and phenethyl; for example

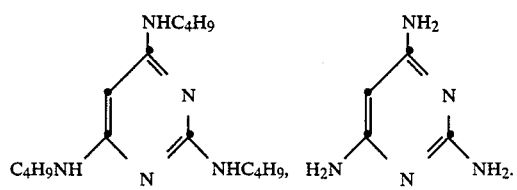

(l) pyrazoles as described in EP-A-87,037 of the formula

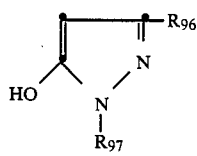

ps in which:

$R_{97}$ is H, $C_1$-$C_4$-alkyl, alkenyl, cyclohexyl, aryl, benzyl and phenylethyl, and $R_{96}$ is $R_{97}$ or $COOR_{97}$ or $CONR_{97}$, for example

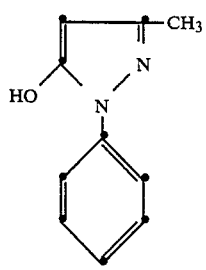

(m) pyrazoles as described in EP-A-87,037 of the formula

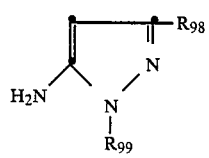

in which:

$R_{99}$ is H, $C_1$-$C_4$-alkyl, alkenyl, cyclohexyl, aryl, benzyl and phenethyl and $R_{98}$ is $R_{99}$ or $COOR_{99}$ or $CONR_{99}$; for example

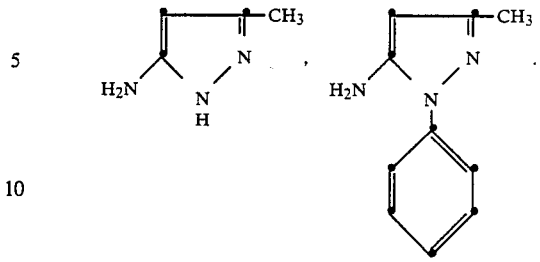

(n) pyrazoles as described in EP-A-0,072,508 and EP-A-0,075,773 of the formula:

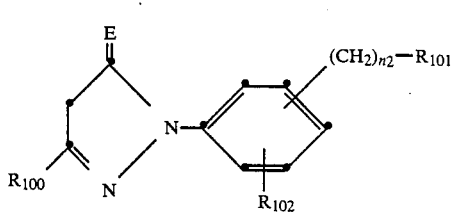

in which:

$R_{100}$ is $C_1$-$C_4$-alkyl or $C_1$-$C_4$-alkoxycarbonyl,

E is NH or O, $R_{102}$ is hydrogen or a nonionic substituent $n_2$ is 0, 1 or 2 and

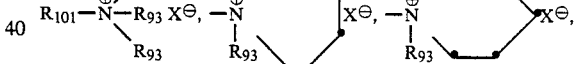

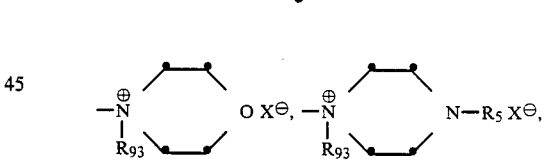

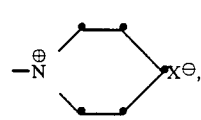

in which $R_{93}$ is hydrogen and $C_1$-$C_4$-alkyl and X is an anion, for example:

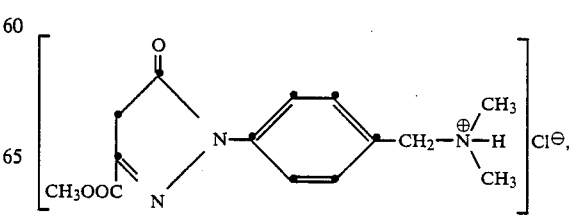

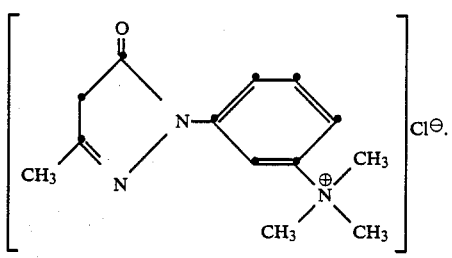 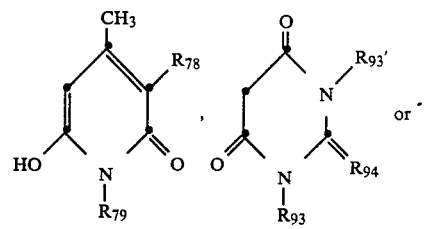

As far as in the above definitions, and in the remaining description alkyl groups, as such or as part of assembled groups, are referred to as "substituted or unsubstituted", examples of possible substituents, unless otherwise stated, are: hydroxyl, cyano, halogen (for example Cl, Br), $C_1$–$C_4$-alkoxy, phenyl (which can be substituted 1–3 times by halogen, methyl or methoxy), amino, alkylamino or dialkylamino. Again, unless otherwise stated, alkyl groups have, as such or as part of assembled groups, preferably 1–8, in particular 1–4, C atoms, and cycloalkyl groups preferably have 5 or 6 C atoms. Examples of groups referred to as nonionic substituents are $C_1$–$C_4$-alkyl, $C_1$–$C_4$-alkoxy and halogen. Aryl is to be understood as meaning preferably naphthyl and in particular phenyl.

In compounds according to the invention, KK can thus be for example the radical of a substituted or unsubstituted phenol, of a substituted or unsubstituted dihydroxybenzene, of a substituted or unsubstituted aniline, of a substituted or unsubstituted diphenylamine, of a substituted or unsubstituted naphthol, of a substituted or unsubstituted naphtholsulfonic acid, of a substituted or unsubstituted dihydroxynaphththalene, of a substituted or unsubstituted naphthylamine, of a substituted or unsubstituted hydroxynaphthylamine, of a substituted or unsubstituted 2,6-diaminopyridine, or a substituted or unsubstituted dihydroxypyridine, of a substituted or unsubstituted pyridone, of a substituted or unsubstituted quinoline, of a substituted or unsubstituted benzimidazole, of a substituted or unsubstituted benzoquinoline, of a substituted or unsubstituted pyrimidine, of a substituted or unsubstituted pyrimidone, of a substituted or unsubstituted indole, or of a substituted or unsubstituted pyrazole.

Examples of possible substituents can be found in the preceding sections (1) to (3) (list of possible coupling components) for the relevant types of coupling components.

In particularly noteworthy compounds of the formula (I), KK is the radical of a substituted or unsubstituted pyrimidine, of a substituted or unsubstituted pyrimidone, of a substituted or unsubstituted 8-hydroxyquinoline, of a substituted or unsubstituted benzimidazole, of a substituted or unsubstituted naphthol, of a substituted or unsubstituted pyridone, of a substituted or unsubstituted naphtholsulfonic acid, of a substituted or unsubstituted aniline or of a substituted of unsubstituted dihydroxybenzene. Examples of these coupling components and of their possible substituents can be found in the preceding sections (3)(c), (d), (e), (g), (i), (k); (1)(a), (c); (2)(a), (b), (c), (d), (e), (f), (g), (h), (i), (m).

Preference is given in particular to those compounds according to the invention in which KK is the radical of a heterocyclic coupling component, in particular to those in which KK is the radical of a coupling component of the formulae

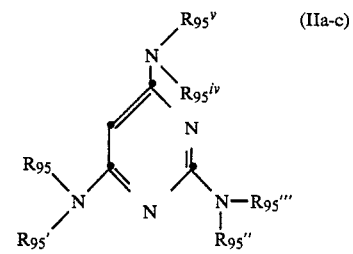

in which
$R_{78}$ is CN, $CONH_2$, $SO_2NH_2$ or $C_1$–$C_4$-alkyl,
$R_{79}$ is hydrogen or substituted or unsubstituted $C_1$–$C_8$-alkyl,
$R_{93}$ and $R_{93}{}^I$, independently of each other, are hydrogen or $C_1$–$C_4$-alkyl,
$R_{94}$ is O or N-CN and
$R_{95}$, $R_{95}{}^I$, $R_{95}{}^{II}$, $R_{95}{}^{III}$, $R_{95}{}^{IV}$ and $R_{95}{}^V$, independently of one another, are each hydrogen, $C_1$–$C_4$-alkyl, $C_2$–$C_4$-alkenyl, cyclopentyl, cyclohexyl, aryl, in particular phenyl, benzyl or phenethyl.

Examples of possible substitutents of alkyl groups $R_{93}$ are: hydroxyl, cyano, halogen, (for example Cl, Br), $C_1$–$C_4$-alkoxy, phenyl (which can be substituted 1–3 times by halogen, methyl or methoxy), amino, alkylamino or dialkylamino.

In likewise particularly noteworthyl compounds of the formula (I), KK is the radical of a coupling component of the formula

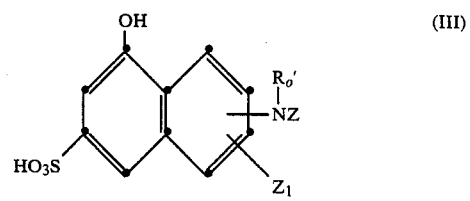

in which $Z_1$ is hydrogen or sulfo and Z is -CO-alkyl(-$C_{1-4}$)-$R_{18}$ or

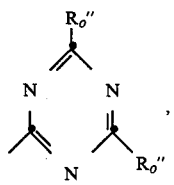

$R_o{}'$ is hydrogen or $C_1$–$C_4$-alkyl, $R_{18}$ is a basic amino group or a cationic ammonium group, preferably pyridinium, both the $R_o{}''$s are independently of each other OH, $NH_2$ or an aliphatic, cycloaliphatic or aromatic amine radical. Therein $R_o''$ preferably is an amine radical of the formula $-NR_a-Q-NR_bR_c$, in which $R_a$ is hydrogen or methyl, Q is $C_1$-$C_6$-alkylene, $R_b$ and $R_c$ are each hydrogen, $C_1$-$C_4$-alkyl, $C_1$-$C_4$-hydroxyalkyl, $C_1$-$C_4$-aminoalkyl or together with the N atom is a piperidine, piperazine or morpholine ring, where the group $NR_bR_c$ can also be quaternised, or Q and $R_a+R_b$ are each $-CH_2-CH_2$, the result being a group of the formula

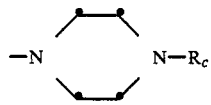

In compounds of the formula (I) in which KK is the radical of one of the abovementioned coupling components of the formulae (IIa-c) or (III), A is preferably the complement to a ring of the formulae

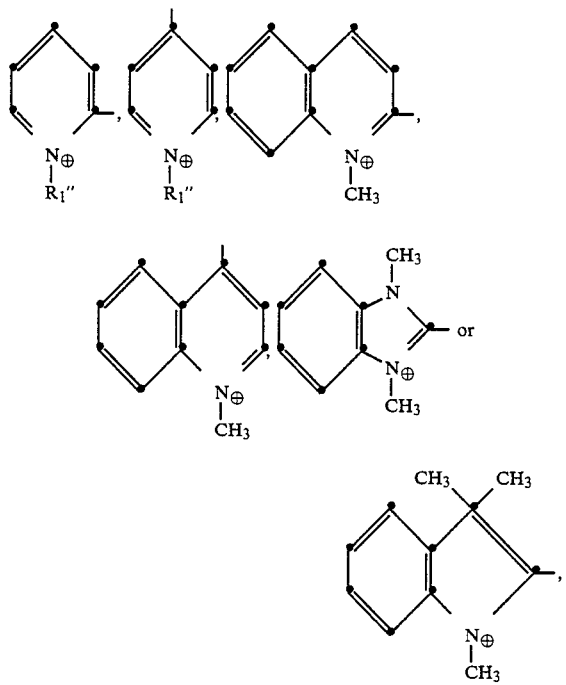

in which $R_1''$ is methyl, ethyl or benzyl.

The anions $X^\ominus$ in the compounds of the formula (I) can be in the case of dyes customary colourless organic and inorganic anions; examples are: chloride, bromide, iodide, hydroxyl, hydrogensulfate, sulfate, nitrate, dihydrogen phosphate, hydrogenphosphate, phosphate, carbonate, methosulfate, ethosulfate, acetate, propionate, benzenesulfonate, toluenesulfonate, formatee, lactate, oxalate and methoxyacetate; but it is also possible for mixtures of various anions to be present.

The charge on the methine-azo compounds of the formula (I) according to the invention is by definition cationic. Since these compounds can also contain anionic groups such as $SO_3H$ and COOH groups, the compounds are subject to the condition that the total number of all cationic and basic groups is greater by at least 1 than the total number of all anionic groups.

The methine-azo compounds of the formula (I) according to the invention are prepared in known manner, for example by diazotising methine compounds of the formula

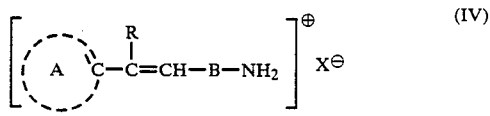

and coupling onto a coupling component HKK, the general symbols being as defined in the formula (I).

The diazotisation and the coupling reaction are carried out in conventional manner, advantageously in an aqueous, acid or weakly alkaline medium.

The methine-azo compounds according to the invention obtained are isolated from the reaction medium in conventional manner, or the process of the preparation is conducted in such a way that a ready-to-use, concentrated solution is obtained at once.

If the compound is isolated, the isolated paste is dried or directly turned into the desired solution.

The coupling components H-KK are known and can be obtained in known manner. Attention is drawn to the coupling components KK mentioned at the beginning.

The methine compounds of the formula (IV) are partly known (see for example: DE-A-2,161,413; Zhurnal Obshchei Khimii, Vol. 43, No. 8, p. 1789-1794, August 1973; US-A-3,185,538, US-A-3,193,195, FR-A-1,391,408, DE-A-1,248,192), or can be prepared in known manner.

In the examples section below, the preparation of some methine compounds of the formula (IV) is described in detail.

These compounds are obtained for example when quaternary salts of the formula

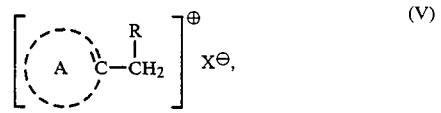

in which the symbols A, R and X are as defined above, are condensed with substituted or unsubstituted aminobenzaldehydes or aminonaphthaldehydes or derivatives thereof (for example immonium salts).

The condensation is carried out at temperatures between 20° and 140° C., preferably between 50° and 110° C., in an organic solvent. Examples of suitable solvents are alcohols, such as methanol, ethanol and propanols and butanols, and also benzylalcohol, ethyl acetate, methyl benzoate, formic acid, acetic acid, $C_2$-$C_5$-glycols, dimethylformamide, dimethylacetamide, tetramethylurea, acetonitrile and benzonitrile. To speed up the condensation reaction it is possible to add basic catalysts, for example triethylamine, pyridine, piperidine, N-ethylpyridine, N-methylmorpholine, alkali metal carbonates, alkali metal acetates and acetates of inorganic or organic nitrogen bases, such as ammonium acetate or piperidine acetate.

The quaternary salts of the formula (V) are known and can be prepared in known manner.

The free amino group of the aminoaldehydes can, if desired, be protected before the condensation by means of an acetyl group which is subsequently split off again by acid hydrolysis.

However, the methine-azo compounds according to the invention can also be prepared by, for example, first diazotising an aminobenzaldehyde or aminonaphthaldehyde of the formula

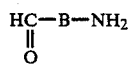

and coupling onto the coupling component KKH and condensing the resulting azo compound of the formula

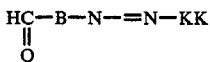

with a quaternary salt of the formula (V). The preferred reaction conditions for the condensation correspond to those described above for the preparation of compounds of the formula (IV). The diazotisation and coupling is effected in known manner.

The methine-azo compounds of the formula (I) and the methine compounds of the formula (IV) are used in particular as dyes for dyeing and printing cationically dyeable substrates, such as wool, silk, leather, acid-modified nylon materials, polyacrylonitrile materials, basically dyeable, modified polyester materials, natural and regenerated cellulose materials, such as cotton and viscose, on which these compounds have good affinity and produce brilliant dyeings which have good fastness properties; they are distinguished in particular by their high tinctorial strength.

A preferred use of the methine-azo dyes of the formula (I) according to the invention lies in the dyeing of paper of all kinds, especially bleached, unsized and sized lignin-free paper. The compounds are very particularly suitable for dyeing unsized paper (tissues) owing to their very high standard affinity for this substrate.

The methine-azo compounds according to the invention exhaust very readily onto these substrates, leaving the waste waters colourless, which is a great technical and ecological advantage, in particular with regard to present-day waste water legislature. The high degree of exhaustion is also of advantage for good shade reproducibility. The degree of exhaust is not affected by the hardness of the water. The dyeings on paper are distinguished in particular by their tinctorial strength, light-fastness and high affinity; they do not tend to bleed when dyed paper in the wet state is brought into contact with moist white paper. This property is particularly desirable for tissues where it is foreseeable that the dyed paper in the wet state (for example soaked with water, alcohol or surfactant solution) will come into contact with other surfaces, for example made of textiles or paper, which need to be protected against soiling.

The high affinity for paper and the high rate of dyeing of the methine-azo dyes according to the invention is of great advantage for the continuous dyeing of paper and thus makes possible a very wide use.

The methine-azo dyes are used not only as powder or granulate preparations but also in the form of concentrated solutions. Powder preparations are used in conventional manner together with standardising materials such as sodium sulfate, sodium phosphate, sodium chloride or sodium acetate in the presence of dedusting agents, or the methine-azo dyes are made commercially available in the form of spray-dried preparations. Concentrated solutions can be of the aqueous or organic-/aqueous kind, customary additives, such as organic acids, for example acetic acid, formic acid or lactic acid, amides such as formamide, dimethylformamide or urea, alcohols such as glycol, diglycol, diglycol ether, especially methyl or ethyl ether, being preferred.

An example of a favourable composition of such liquid preparations is:

| | |
|---|---|
| 100 | parts of a methine-azo compound of the formula (I), |
| 1–100. | parts of an organic acid such as formic, acetic, lactic or citric acid, |
| 100–800 | parts of water and |
| 0–500 | parts of a solubiliser (for example glycols such as diethylene glycol, triethylene glycol or hexylene glycol, glycol ethers such as methyl cellosolve, methyl carbitol, butyl polyglycol, urea, formamide, dimethylformamide). |

The following examples illustrate the invention and the preparation of the starting materials in more detail. Parts and percentages are by weight, unless otherwise stated.

(A) STARTING MATERIALS

Example 1

(a) 85.8 g of N-methyl-4-methylpyridinium chloride and 103.1 g of 4-acetaminobenzaldehye are suspended at room temperature in 720 ml of isopropanol. 10 ml of piperidine are added, and the mixture is refluxed for 2 hours. The mixture is then cooled down with stirring to room temperature and is finally also cooled in an ice bath. The yellowish brown crystal mass is then filtered off with suction and washed with a total of 150 ml of cold isopropanol. Drying leaves 155 g of a yellow crystalline powder.

(b) 57.7 g of the powder obtained in (a) are refluxed for 1 hour in a solution of 200 ml of water and 200 ml of 32% hydrochloric acid. The resulting yellow solution, after cooling down, is standardised with water to a weight of 493 g. This solution is used in this form for diazotisation, and contains the compound of the formula

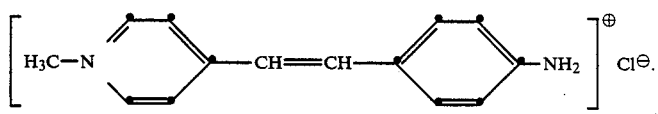

Examples 2–13

Example 1 is repeated, except that in Example 1(a) the N-methyl-4-methylpyridinium chloride is replaced by the quaternary salts listed in column II of Table 1. The products indicated in column III are obtained.

TABLE I

| Ex. | Quartenary salts (II) | Products R = •CH=CH—⟨C6H4⟩—NH2 (III) |
|---|---|---|
| 2 | [2-methyl-1-methylpyridinium]⁺ Cl⁻ | [2-R-1-methylpyridinium]⁺ Cl⁻ |
| 3 | [2,4-dimethyl-1-methylquinolinium-type]⁺ CH3SO4⁻ | [corresponding R-substituted]⁺ CH3SO4⁻ |
| 4 | [2-methyl-1-methylquinolinium]⁺ CH3SO4⁻ | [2-R-1-methylquinolinium]⁺ CH3SO4⁻ (present as suspension) |
| 5 | [4-methyl-1-ethylpyridinium]⁺ Cl⁻ | [4-R-1-ethylpyridinium]⁺ Cl⁻ |
| 6 | [4-methyl-1-(2-hydroxyethyl)pyridinium]⁺ Cl⁻ | [4-R-1-(2-hydroxyethyl)pyridinium]⁺ Cl⁻ |
| 7 | [4-methyl-1-benzylpyridinium]⁺ Cl⁻ | [4-R-1-benzylpyridinium]⁺ Cl⁻ |
| 8 | [3-methyl-2-methylbenzothiazolium]⁺ CH3SO4⁻ | [3-methyl-2-R-benzothiazolium]⁺ CH3SO4⁻ |

Products R = —CH=CH—⟨C6H4⟩—NH2

TABLE I-continued

| I | II | III |
|---|----|-----|
| 9 | ![structure: (CH3)2CH-N+=pyridine-CH3, Cl−] | ![structure: (CH3)2CH-N+=pyridine-R, Cl−] |
| 10 | ![structure: cyclohexyl-CH-N+=pyridine-CH3, Cl−] | ![structure: cyclohexyl-CH-N+=pyridine-R, Cl−] |
| 11 | ![structure: naphthyl-indolenine with N-CH3 and CH3, CH3SO4−] | ![structure: naphthyl-indolenine with N-CH3 and R, CH3SO4−] |
| 12 | ![structure: benzoxazinium with CH3, CH3SO4−] | ![structure: benzoxazinium with R, CH3SO4−] |
| 13 | ![structure: naphthodiazine with N-CH3 groups and CH3, CH3SO4−] | ![structure: naphthodiazine with N-CH3 groups and R, CH3SO4−] |
| 13a | ![structure: benzodiazine with N-CH3 groups and CH3, CH3SO4−] | ![structure: benzodiazine with N-CH3 groups and R, CH3SO4−] |

Example 14

24.5 g of the hydrochloride of chlorinated Fischer base (1,2,3,3-tetramethyl-5-chloroindolenine) and 17.3 g of 4-acetaminobenzaldehyde are refluxed for 1 hour in 750 ml of n-butanol. The deep red solution is concentrated in a rotary evaporator to a volume of about 200 ml, and after cooling down about 600 ml of ether are added to precipitate the product. The precipitated product is filtered off, washed with ether and dried. This gives 41.3 g of a red powder. The powder is refluxed for 1 hour in 400 ml of water and 400 ml of concentrated hydrochloric acid. Cooling down is followed by filtration, washing with water and drying.

This gives 22.15 g of the starting material of the formula

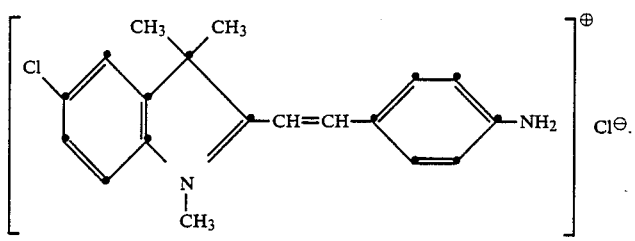

Example 15

The method of Example 14 is used to convert the Fischer base into the compound of the formula

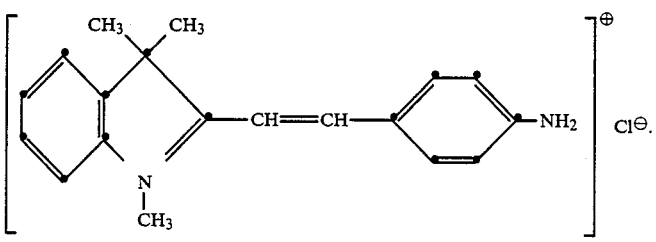

Example 16

47.5 g of 4-picoline, 150 ml of isopropanol and 81.3 g of phenacyl chloride are heated to 150° C. in an autoclave for 3 hours. After cooling down, the brown suspension is filtered and the filter cake is thoroughly washed with ether. Drying leaves 113 g of a beige crystalline powder.

49.5 g of this powder are refluxed for 32 hours in 240 ml of isopropanol together with 34.3 g of 4-acetaminobenzaldehyde and 3.5 ml of piperidine. Cooling down in an ice bath is followed by filtration and washing of the residue with a little isopropanol. The residue is recrystallised from 300 ml of n-butanol; this gives 44.6 g of a reddish brown powder.

19.6 g of this powder are dissolved in 50 ml of hot glacial acetic acid, and 50 ml of water and 50 ml of 32% hydrochloric acid are then added. One hour under reflux is followed by stirring until cold, subsequent cooling in an ice bath, filtration and washing with a little cold water. Drying leaves 9.3 g of the compound of the formula

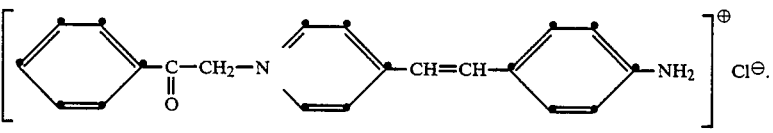

Example 17

5.5 g of N-methyl-4-methylpyridinium chloride, 5 g of 2-aminobenzaldehyde and 0.65 ml of piperidine are refluxed in 75 ml of isopropanol for 5 hours. About 70 ml of solvent are then distilled off during a further hour. The cold, oily residue has gradually added to it, dropwise and with stirring, 400 ml of acetone, and the mixture is stirred overnight. The partly crystalline, partly oily residue is filtered off and redissolved in 20 ml of methanol, the solution is clarified by filtration, and the product is reprecipitated with 1 liter of acetone. The precipitated residue is filtered and dried. This gives 4.5 g of the compound of the formula

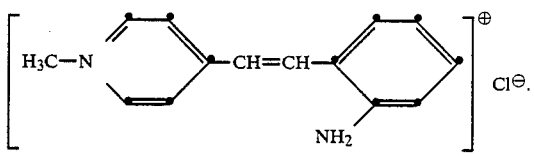

(B) END PRODUCTS

Example 18

12.8 g of the solution described in Example 1b are cooled down to 0°–5° C. and are diazotised with 5.0 ml of 1N sodium nitrite solution. After ½ hour of stirring at 0°–5° C. any excess nitrite is destroyed with a little sulfamic acid. The result is a yellow solution.

This diazo solution is added to 0.65 g of barbituric acid dissolved in 30 ml of a mixture of dimethylformamide and water in a ratio of 1:1. The result is a pale orange-yellow solution. The solution is then brought to about pH 4–5 with crystalline sodium acetate, and the dye precipitates in crystalline form. This is followed by stirring at room temperature for 2 hours, filtration and washing with 5% NaCl solution. Drying gives the compound of the formula

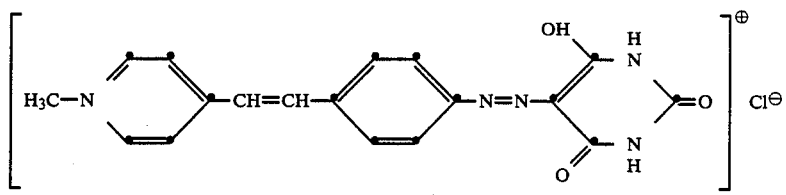

in the form of a yellow powder with a melting point of >280° C. which is very readily water-soluble and is highly suitable for dyeing paper and polyacrylonitrile in yellow shades.

Examples 19–22

Example 18 is repeated, except that the coupling components indicated in column II of Table 2 below are used, affording compounds of the formula:

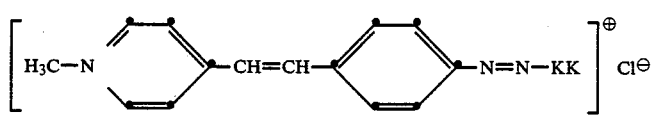

the shade of which on paper and polyacrylonitrile is indicated in column III.

TABLE 2

| I Example No. | II H—KK | III Shade |
|---|---|---|
| 19 | (O=C-CH2-C=O with N-CH3 and N-C(=O)-CH3) | Yellow |
| 20 | (O=C-CH2-C=O with NH and =N-CN) | Yellow |
| 21 | (pyrimidine with NH2, NH2, NH2) | Orange |

TABLE 2-continued

| I Example No. | II H—KK | III Shade |
|---|---|---|
| 22 | (structure with N(CH3)2, N(CH3)2, HN-CH(CH3)2) | Blueish red |

Example 23

The compound of Example 1b is diazotised, and the diazo solution is then poured onto a solution of 1.1 g of the compound of the formula

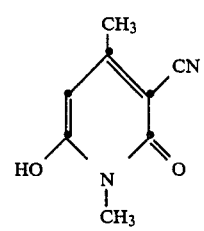

in 12 ml of water and 5 ml of 1N sodium hydroxide solution. An orange suspension forms at once. The pH is set with concentrated sodium carbonate solution to 5, and a further 30 ml of water added since the suspension otherwise becomes excessively thick. 2 hours of stirring is followed by filtration and washing with a little 2% sodium chloride solution. Drying leaves 2.2 g of a dark brown powder of the formula

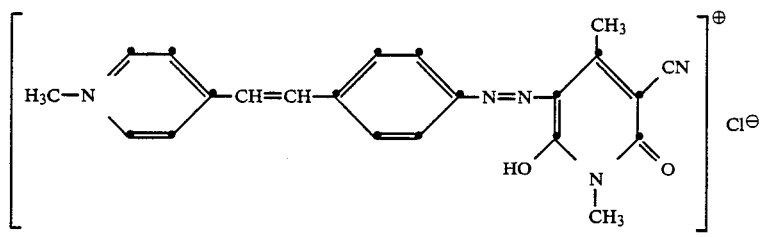

which is very readily water-soluble and dyes both paper and polyacrylonitrile in orange shades.

Example 24

The compound of Example 1b is diazotised, and the diazo solution is then poured onto 12.2 g of a coupling component obtained in accordance with DE-A-2,915,323, Example d. The pH is set with concentrated sodium carbonate solution to 5. After 2 hours of stirring, diazo compound is no longer detectable. The pH is then set with sodium carbonate solution to 10, and an oily precipitate deposits on the walls. The mother liquor is decanted off and the residue is dried at 70° in vacuo, solidifying into crystalline form. The result obtained is 4.6 g of a black powder of the following structure

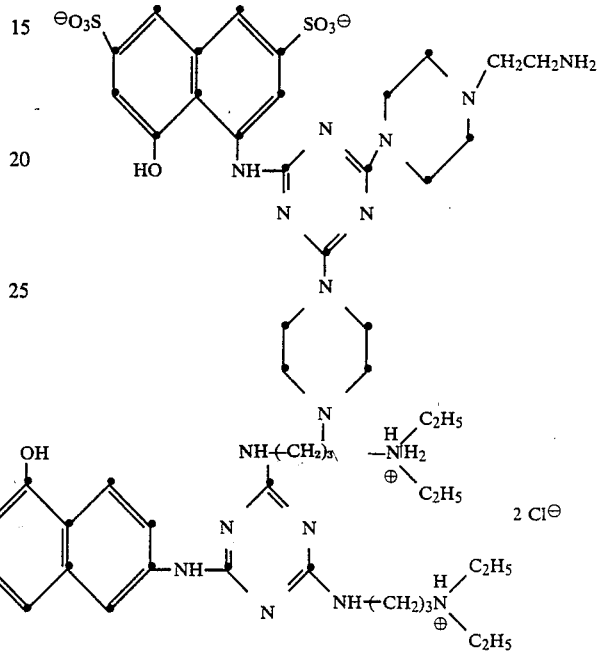

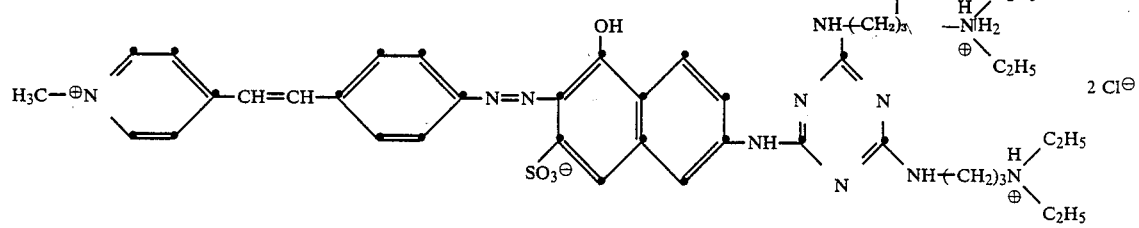

(Melting point: 225°–228° C.) which is readily soluble in 5% acetic acid and dyes paper in a strongly blueish red shade.

Example 25

Example 24 is repeated, except that the indicated coupling component is replaced by the analogously prepared coupling component of the formula affording 4.4 g of the dye of the formula

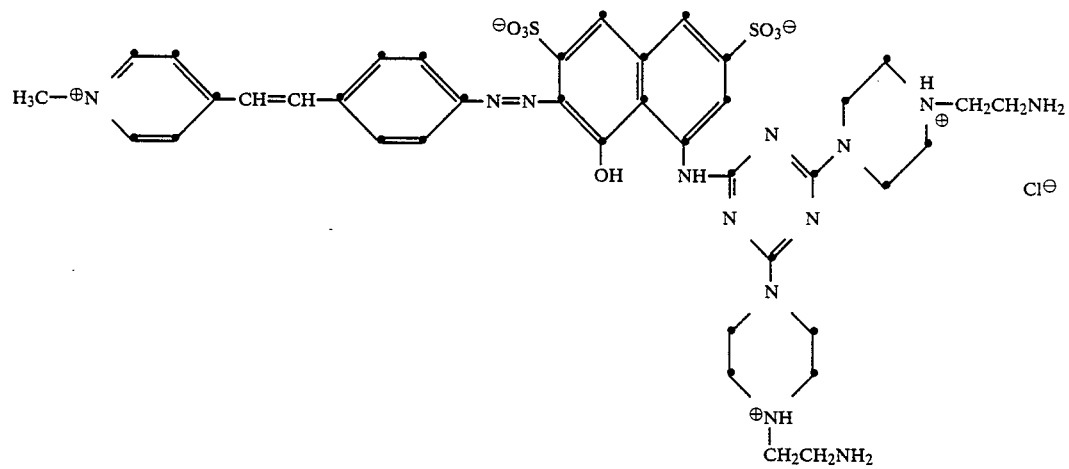

which dyes paper in a violet-blue shade.

Example 26

The compound of Example 1b is diazotised, and the diazo solution is poured onto a solution of 1.98 g of a compound of the formula

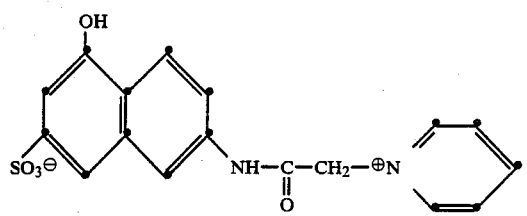

in 40 ml of water and 5 ml of 1N sodium hydroxide solution. The pH is then set with concentrated sodium carbonate solution to 5, and the violet suspension is stirred at room temperature for 2 hours. It is then filtered, and the filter residue is washed with 5% NaCl solution. Drying leaves 2.6 g of the dye of the formula

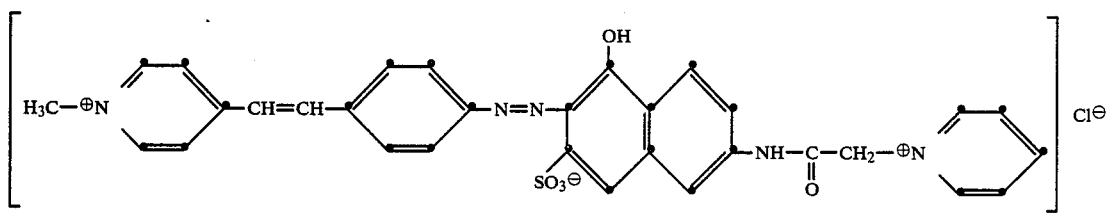

which dyes paper in a very strongly blueish red.

Example 27

17 g of a 9.7% aqueous hydrochloric acid solution of a starting material from Example 7 are diazotised at 0°–5° C. with 5.1 ml of 1N sodium nitrite solution. After half an hour of stirring at 0°–5° C., the diazo compound is virtually dissolved. It is then poured onto 0.66 g of 2,4,6-triaminopyrimidine in 10 ml of water, and the pH is set with concentrated sodium carbonate solution to 5. Stirring for a further half hour at room temperature is followed by filtration and washing with water. Drying leaves 2.35 g of the dye of the formula

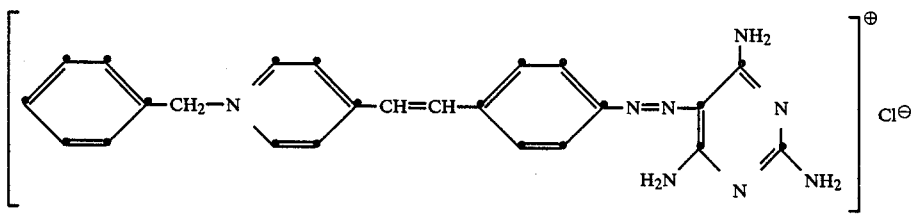

which dyes paper in an orange-coloured shade.

Examples 28–31

Replacing in Examples 19, 18 and 21 and 24 the starting material from Example 1b in each case by the starting material from Example 2 gives the dyes of the formula

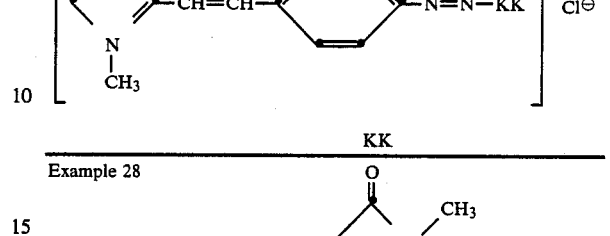

Example 28

KK

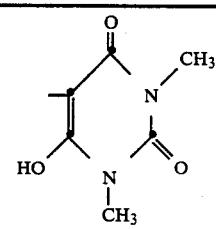

Example 29

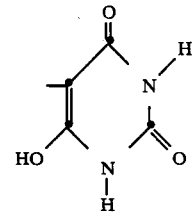

Example 30

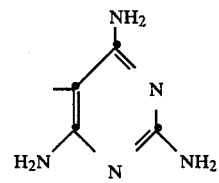

Example 31

-continued

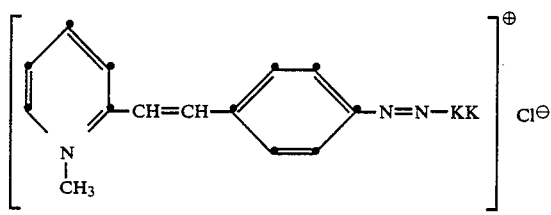

KK

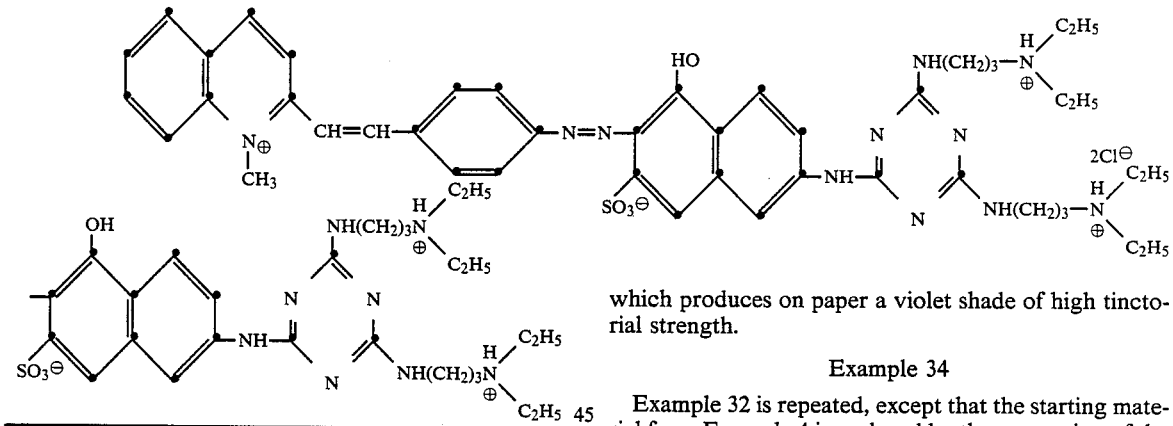

The shade of these products on paper is slightly hypsochromically shifted compared with the analogous 4-picoline dyes.

Example 32

19.1 g of the hydrochloric acid suspension described in Example 4 are briefly brought to the boil and turned into a solution. The solution is poured onto 25 g of ice, the mixture is additionally cooled in an ice bath, and 5 ml of 1N sodium nitrite solution are added. After half an hour of stirring at 0°–5° C. virtually everything is dissolved. This diazo solution is clarified by filtration through glass wool and is poured into a solution of 0.65 g of triaminopyridine dissolved in 30 ml of dimethylformamide and 30 ml of water. The pH is adjusted with crystalline sodium acetate to 4–5, followed by stirring at room temperature for 2 hours. The very fine suspension is filtered and is washed with 5% NaCl solution. This gives 2.3 g of the compound of the formula

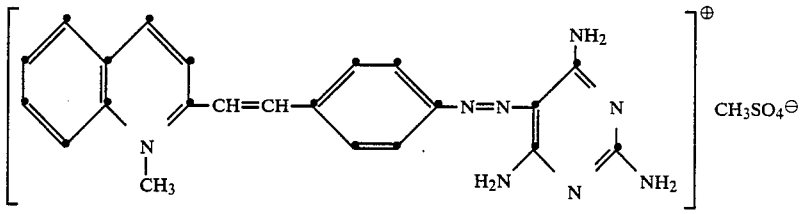

which dyes paper in a reddish brown.

Example 33

On replacing in Example 32 the triaminopyrimidine by the coupling component of Example 24, this gives the dye of the formula which produces on paper a violet shade of high tinctorial strength.

Example 34

Example 32 is repeated, except that the starting material from Example 4 is replaced by the suspension of the starting material from Example 3 and 20 g of sodium chloride are added before the filtration, affording 1.5 g of the compound of the formula

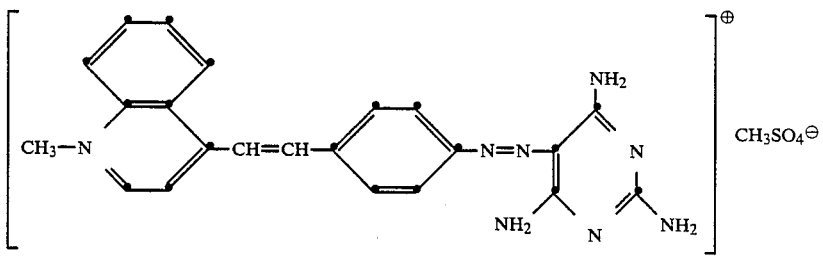

which dyes paper in a strongly reddish brown.

Example 35

On replacing in Example 34 the triaminopyrimidine by barbituric acid, this gives the orange dye of the formula

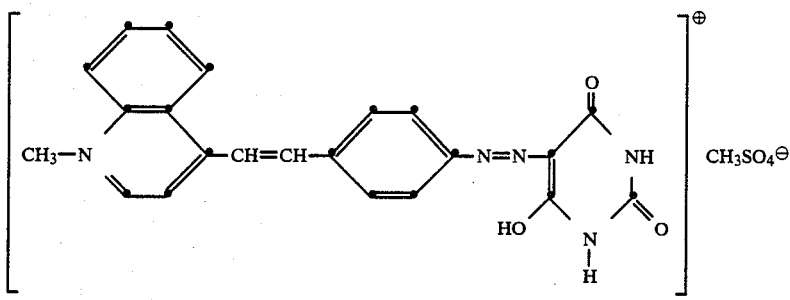

Example 36

2.8 g of the starting material from Example 13a are diazotised in 50 ml of water and 2.25 ml of 30% hydrochloric acid with sodium nitrite. The diazo solution is poured into a solution of 0.95 g of triaminopyrimidine dissolved in 20 ml of dimethylformamide and 20 ml of water, and the pH is set to 5.2. 3 hours of stirring are followed by filtration, washing with a little 5% NaCl solution and drying. This gives the compound of the formula which dyes paper in an orange shade having good fastness properties.

Example 37

On replacing in Example 36 the triaminopyridine by the equivalent amount of β-naphthol, this gives the compound of the formula

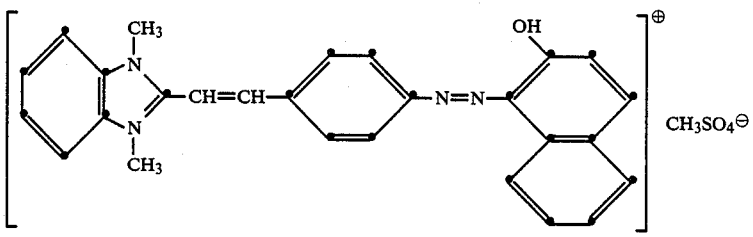

which dyes paper in a blueish red shade having good fastness properties.

Example 38

0.2 g of the dye prepared in Example 23 is pasted up with 2 g of 40% aqueous acetic acid and then dissolved by addition of 4000 ml of hot water. 1 g of sodium acetate and 2 g of an adduct, quaternised with dimethyl sulfate, of 15 to 20 equivalents of ethylene oxide on N-octadecyldiethylenetriamine are added, and 100 g of polyacrylonitrile fabric are entered at 60° C. The bath is raised to 100° C. in the course of 30 minutes, and dyeing is then carried out at the boil for 90 minutes. The liquor is then allowed to cool down to 60° C. in the course of 30 minutes. The material thus dyed is then removed and subsequently rinsed with lukewarm and cold water. The polyacrylonitrile fabric has been dyed an orange colour. The dyeing has a good light fastness.

Example 39

A polyacrylonitrile copolymer consisting of 93% acrylonitrile and 7% vinyl acetate is dissolved in 15% strength dimethylacetamide. The spinning liquid is extruded into a spin bath which consists of 40% dimethylacetamide and 60% water. The resulting tow is subsequently stretched by known methods and rinsed with hot and cold water to remove dimethylacetamide.

This wet tow is dyed by dipping into a bath at 42° C. of the following composition:
4.5 g/l dye of Example 21
pH 4.5 with acetic acid.

The contact time between tow and dyeing liquor is 3-5 seconds. The excess dyeing liquor is subsequently squeezed off and the tow is fed into the dryer. The result is an orange tow having good fastness properties.

Example 40

A print paste is prepared to consist of:
10 g of the dye obtained as described in Example 24,
30 g of thiodiglycol,
20 ml of 80% acetic acid,
350 ml of boiling water,
500 g of carob bean flour thickening,
30 g of tartaric acid,
15 g of di-(β-cyanethyl)-formamide and
30 g of a naphthalenesulfonic acid/formaldehyde condensation product.

A polyacrylonitrile fabric printed with this print paste is then fixed at 101° to 103° C. in an HT festoon ager in the course of 20 to 30 minutes and is finished in conventional manner. The result obtained is a bluish red print.

Example 41

A paper web of bleached beech sulfite (22° SR) is prepared on a continuous laboratory paper machine. An aqueous solution of the dye of Example 18 is continuously metered under conditions of high turbulence into the thin stuff 10 seconds ahead of the head box (0.2% dye, liquor ratio 400:1, water hardness: 10° German hardness, pH 6, temperature 20° C.).

The result is a yellow shade on the paper web. The waste water is completely colourless.

Example 42

50 g of chemically bleached beech sulfite are mixed with 50 g of bleached spruce sulfite (freeness: 22° SR)

and 0.2 g of the dye of Example 29 in water (pH 6, water hardness 10° German hardness, temperature 20° C., liquor ratio 40:1). After stirring for 15 minutes, sheets of paper are prepared on a Frank sheet-former.

The paper has been dyed a very deep yellow shade. The waste water is completely colourless. The degree of exhaustion is practically 100%. The wet fastness properties are excellent.

If in Examples 38–42 the remaining compounds of Examples 18–37 are used as dyes, this likewise produces good and fast dyeings on the respective substrates.

I claim:

1. A methine-azo compound of the formula

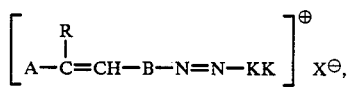

in which A is one of the following rings

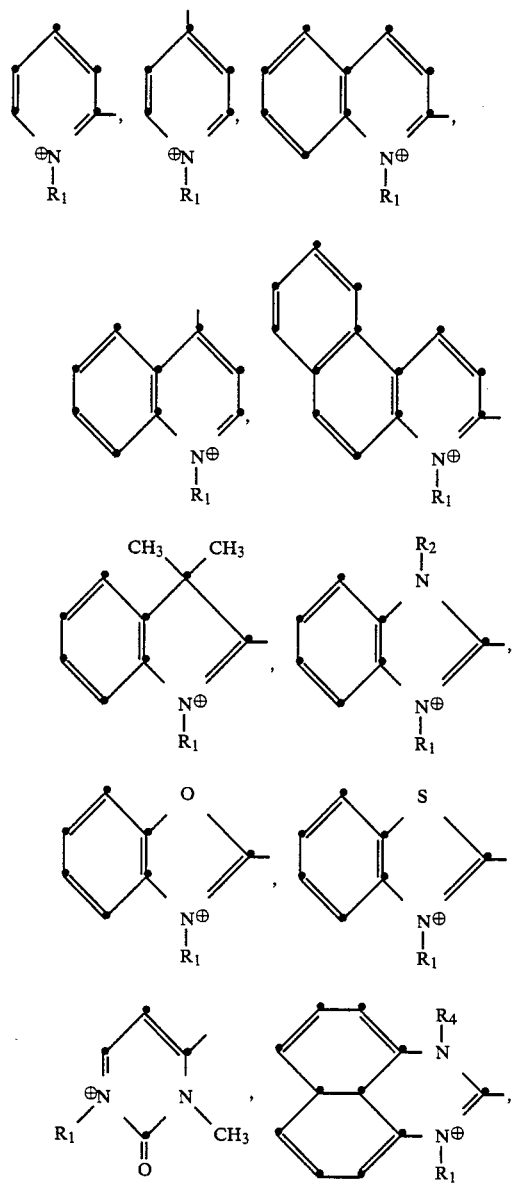

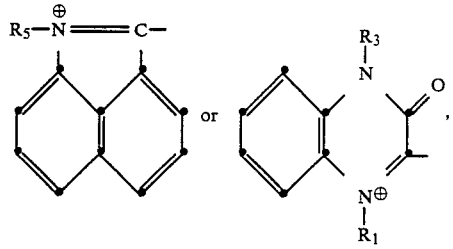

in addition to the substituents $R_1$–$R_5$ the rings of A are unsubstituted or are substituted by nitro, halogen, cyano, $C_1$–$C_4$-alkyl, $C_1$–$C_4$-alkoxy, acetylamino or dimethylamino, and in which $R_1$, $R_2$, $R_3$ and $R_4$, independently of one another, are $C_1$–$C_8$-alkyl, $C_2$–$C_8$-alkenyl, or $C_3$–$C_6$-cycloalkyl, or are one of these groups in which the alkyl, alkenyl or cycloalkyl chain is interrupted by oxygen or nitrogen atoms, wherein these groups are unsubstituted or are substituted by halogen, cyano, hydroxyl, alkoxy, phenyl, phenoxy, dialkylamino, trialkylammonium, acetylamino, alkylcarbonyl, alkoxycarbonyl, alkylsulfonyl, phenylsulfonyl, benzylsulfonyl, alkylsulfonamido, phenylsulfonamido, benzylsulfonamido, alkylcarbonylamino, benzoyl, benzoylamino, alkylcarbamoyl, phenylcarbamoyl, benzylcarbamoyl, alkylcarbamoyloxy, phenylcarbamoyloxy or benzylcarbamoyloxy, and $R_5$ is phenyl or is as defined for $R_1$, R is hydrogen, cyano or $C_2$–$C_3$-alkylene which is bonded to an N atom of ring A to form a 5- or 6-membered ring, B is unsubstituted phenylene or naphthylene or phenylene or naphthylene which is substituted by $C_1$–$C_4$-alkyl, $C_1$–$C_4$-alkoxy, halogen, sulfo or acetylamino, $X^\ominus$ is an anion and KK is the radical of a coupling component of the formula

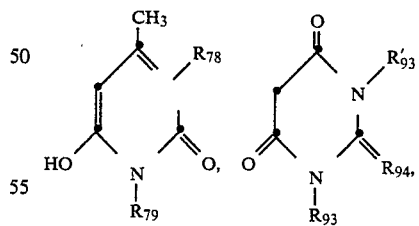

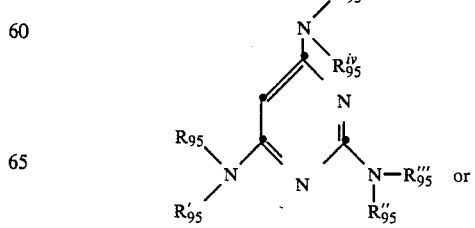

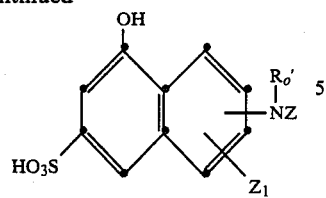

in which
- R$_{78}$ is CN, CONH$_2$, SO$_2$NH$_2$ or C$_1$-C$_4$-alkyl,
- R$_{79}$ is hydrogen or substituted or unsubstituted C$_1$-C$_8$-alkyl,
- R$_{93}$ and R$_{93}{}^I$, independently of one another, are hydrogen or C$_1$-C$_4$-alkyl,
- R$_{94}$ is O or N—CN and
- R$_{95}$, R$_{95}{}^I$, R$_{95}{}^{II}$, R$_{95}{}^{III}$, R$_{95}{}^{IV}$ and R$_{95}{}^V$, independently of one another, are hydrogen, C$_1$-C$_4$-alkyl, C$_2$-C$_4$-alkenyl, cyclopentyl, cyclohexyl, phenyl, benzyl or phenethyl,
- Z$_1$ is hydrogen or sulfo and Z is —CO—alkyl(-C$_1$-C$_4$)-R$_{18}$ or

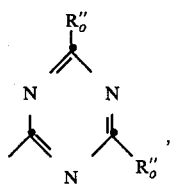

R$_o{}^I$ is hydrogen or C$_1$-C$_4$-alkyl, R$_{18}$ is a basic amino group or a cationic ammonium group, both the R$_o{}^{II}$s independently of each other are OH, NH$_2$ or an aliphatic, cycloaliphatic or aromatic amine radical.

2. A methine-azo compound according to claim 1, in which R is hydrogen.

3. A methine-azo compound according to claim 1, in which B is phenylene.

4. A methine-azo compound according to claim 3, in which B is 1,4-phenylene.

5. A methine-azo compound according to claim 1, in which A is one of the following rings

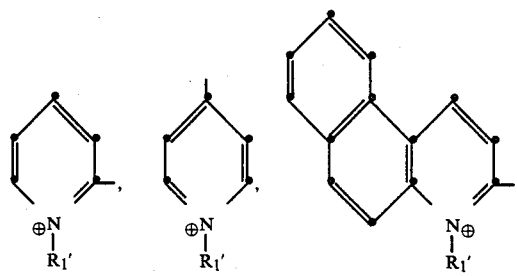

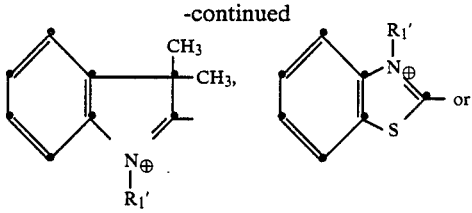

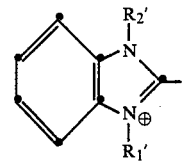

in which R$_1{}^I$ and R$_2{}^I$ independently of each other, are C$_1$-C$_4$-alkyl, benzyl, cyclohexyl, hydroxyalkyl or C$_3$-C$_4$-alkenyl and the stated rings are otherwise unsubstituted or substituted by halogen, cyano, C$_1$-C$_4$-alkyl, C$_1$-C$_4$-hydroxyalkyl or C$_1$-C$_4$-alkoxy.

6. A methine-azo compound according to claim 5, in which A is a pyridinium or 3,3-dimethylindolenium ring in which R$_1{}^I$ is methyl.

7. A methine-azo compound according to claim 1, in which R$_{18}$ is a pyridinium group.

8. A methine-azo compound according to claim 1, in which R$_o{}^{II}$ is an amine radical of the formula —N-R$_a$—Q—NR$_b$R$_c$, in which R$_a$ is hydrogen or methyl, Q is C$_1$-C$_6$-alkylene, R$_b$ and R$_c$ are each hydrogen, C$_1$-C$_4$-alkyl, C$_1$-C$_4$-hydroxyalkyl, C$_1$-C$_4$-aminoalkyl or together with the N atom are a piperidine, piperazine or morpholine ring, where the group NR$_b$R$_c$ can also be quaternised, or Q and R$_a$+R$_b$ each are —CH$_2$—CH$_2$, a group of the formula

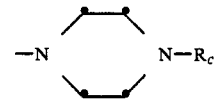

being formed as a result.

9. A methine-azo compound according to claim 1, in which A is a ring of the formulae

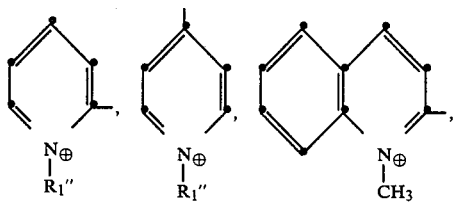

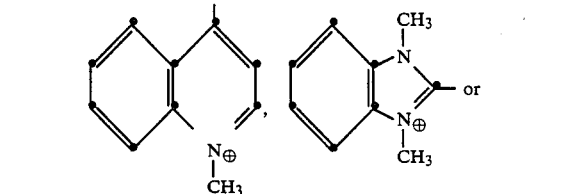

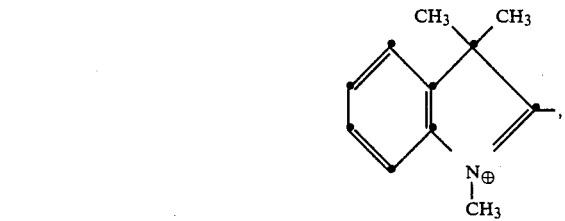

in which R$_1{}^{II}$ is methyl, ethyl or benzyl.

* * * * *

UNITED STATES PATENT AND TRADEMARK OFFICE
CERTIFICATE OF CORRECTION

PATENT NO. : 4,883,866
DATED : November 28, 1989
INVENTOR(S) : PETER MOCKLI

It is certified that error appears in the above-identified patent and that said Letters Patent is hereby corrected as shown below:

On the cover page, in section "[63]", change "Aug. 21, 1986" to

--Aug. 21, 1985--.

In column 1, line 6, change "Aug. 21, 1986" to --Aug. 21, 1985--.

Signed and Sealed this

Nineteenth Day of February, 1991

*Attest:*

HARRY F. MANBECK, JR.

*Attesting Officer*          *Commissioner of Patents and Trademarks*